United States Patent
Bondarev et al.

(10) Patent No.: US 7,136,591 B2
(45) Date of Patent: Nov. 14, 2006

(54) INTELLIGENT SENSOR PLATFORM

(75) Inventors: Vadim Bondarev, Bellevue, WA (US); Eric Richard Brooks, Mukilteo, WA (US)

(73) Assignee: System to ASIC, Inc., Bothell, WA (US)

( * ) Notice: Subject to any disclaimer, the term of this patent is extended or adjusted under 35 U.S.C. 154(b) by 16 days.

(21) Appl. No.: 10/876,884

(22) Filed: Jun. 25, 2004

(65) Prior Publication Data

US 2004/0249485 A1 Dec. 9, 2004

Related U.S. Application Data

(63) Continuation of application No. 09/547,446, filed on Apr. 12, 2000, now Pat. No. 6,826,369.

(60) Provisional application No. 60/130,907, filed on Apr. 23, 1999.

(51) Int. Cl.
*H04B 10/00* (2006.01)
(52) U.S. Cl. .................. 398/106; 398/174; 398/183
(58) Field of Classification Search ............. 398/106, 398/174, 183; 330/254; 340/37.1; 356/623
See application file for complete search history.

(56) References Cited

U.S. PATENT DOCUMENTS

| | | | |
|---|---|---|---|
| 4,361,815 A | 11/1982 | Schade, Jr. | |
| 4,704,607 A | 11/1987 | Teather et al. | |
| 5,099,193 A | 3/1992 | Moseley et al. | |
| 5,243,181 A | 9/1993 | Bondarev | |
| 5,442,168 A | 8/1995 | Gurner et al. | |
| 5,457,478 A | 10/1995 | Frank | |
| 5,470,155 A | 11/1995 | Jensen | |
| 5,511,007 A | 4/1996 | Nihei et al. | |
| 5,530,548 A | 6/1996 | Campbell et al. | |
| 5,708,551 A | 1/1998 | Bosatelli | |
| 5,730,219 A | 3/1998 | Tubel et al. | |
| 6,034,521 A | 3/2000 | Eckardt | |
| 6,088,143 A | 7/2000 | Bang | |
| 6,177,903 B1 | 1/2001 | Fullerton et al. | |
| 6,311,089 B1 | 10/2001 | Mann et al. | |
| 6,494,829 B1 * | 12/2002 | New et al. | 600/300 |

\* cited by examiner

*Primary Examiner*—David C. Payne
(74) *Attorney, Agent, or Firm*—Miller Patent Services; Jerry A. Miller

(57) ABSTRACT

An intelligent sensor platform is provided with an architecture that takes advantage of a low cost microcontroller for overall sensor control. Outputs are all controlled directly by the microcontroller as are gains of signal processing amplifiers and thresholds for threshold detectors. The sensor can be remotely programmed using a remote control device or simple push button programming can be implemented. This abstract is not to be considered limiting, since other embodiments may deviate from the features described in this abstract.

20 Claims, 23 Drawing Sheets

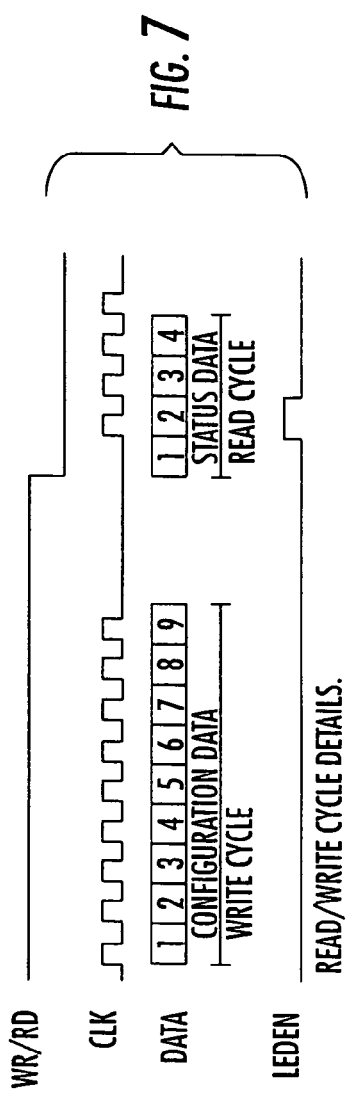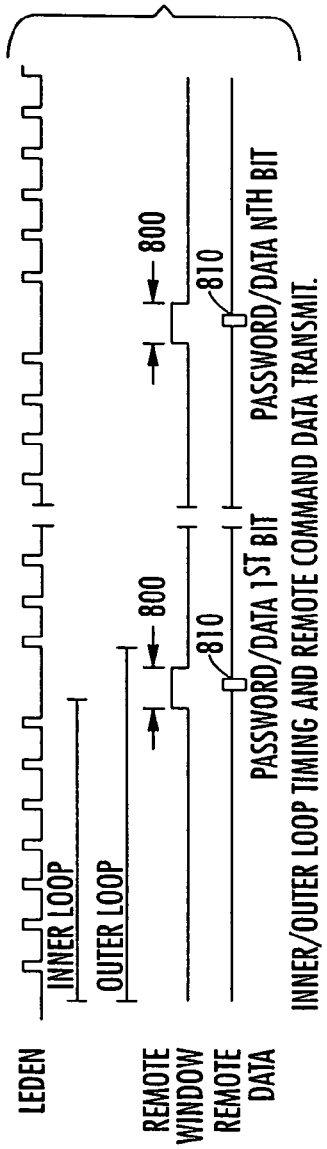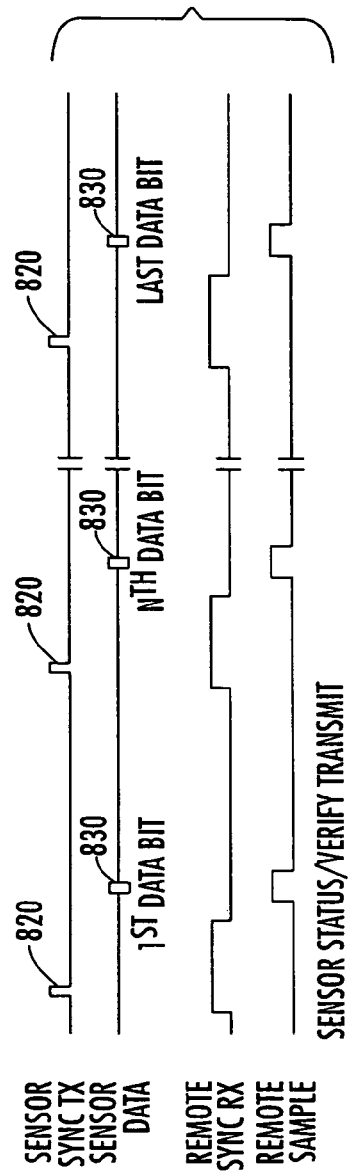

INTELLIGENT SENSOR PLATFORM

CROSS REFERENCE TO RELATED DOCUMENTS

This application is a continuation of, and claims priority benefit of U.S. patent application Ser. No. 09/547,446, filed Apr. 12, 2000 now U.S. Pat. No. 6,826,369, entitled "Intelligent Sensor Platform", which is currently pending and claims priority benefit of provisional patent application Ser. No. 60/130,907 filed Apr. 23, 1999, entitled "Intelligent Sensor Platform (ISP) with Contact and Non-Contact Remote Control and Programming", both naming Vadim Bondarev and Eric Brooks as inventors. These applications are hereby incorporated by reference as if disclosed fully herein.

FIELD OF THE INVENTION

This invention relates generally to the field of sensors. More particularly, in certain embodiments, this invention relates to industrial sensors such as optical, magnetic, capacitive, inductive, etc.

BACKGROUND OF THE INVENTION

There are many applications for sensors such as photoelectric sensors. These devices are used in many industrial applications to detect, for example, the presence or absence of a part on an assembly line. Such devices might, for example, incorporate a photoelectric transmitter and receiver which detects the presence or absence of varying amounts of light transmitted from the transmitter and received by the receiver as an indication of the presence or absence or type of the part on the assembly line. In other examples, an inductive sensor might incorporate an excitation oscillator (transmitter) and a receiver which detects the presence or absence or change in frequency of varying amounts of magnetic field originated by the transmitter.

In the industrial environment, there are many applications for such devices. Each application, in general, must be individually engineered and adjusted so that it functions properly within the parameters of the installation. For example, for a given transmitter output level, a small amount of receiver gain is needed in order to detect an object which is only a short distance away from the sensor. However, much larger receiver gain is required to detect the same object farther away from the sensor. Additional adjustments may be required to account for differences in size and background of the object and throughout the life of the sensor to compensate for the effects of the operating environment.

In conventional sensor systems, these gains are often adjusted by manual adjustment of a potentiometer. Unfortunately, in harsh industrial environments, these potentiometers can become dirty or noisy. Moreover, the potentiometers are frequently damaged by over or under adjustment and are prone to drift with time, component aging, vibration, etc. Furthermore, the fact that access to the sensors is required for routine adjustment can lead to a compromise in sensor location from the perspective of performance or safety. In some applications, significant system down time can be required to safely perform routine sensor adjustment and maintenance. Computer controlled sensors can be utilized to ameliorate some of these issues. However, the cost and size of computer controlled sensors has lead to poor acceptance in the marketplace.

The current state of the art in intelligent sensor architecture can be summarized in two approaches: 1) microcontroller based sensor units made to interface to discrete elements directly, creating high component count, fault susceptible, noise sensitive units; and 2) microcontroller based units made to interface to industry standard standalone ASICs, providing, inflexible component intensive solution with minimum 'system visibility'.

Currently, the sensor market is dominated by large and expensive to manufacture sensor devices which are application specific (i.e. no onboard microcontroller control). Over the last few years there has been a slow introduction of microcontroller controlled sensors which offer few additional features over the older type sensors but at significant price/size premiums. With the exception of the microcontroller these sensors are architecturally equivalent to their predecessors. Both types of the sensor families provide support for a variety of features, but they do so by providing a host of sensor models individually tailored to the application with a minimum number of user programmable configuration options and with a price structure based on the overall volume associated with each model. Since the cost of these units is also volume dependent market penetration of non essential features tends to be limited. Furthermore, custom feature sets that might be desirable by some users require significant engineering to produce limiting the economic attractiveness of small volume users.

SUMMARY OF THE INVENTION

The present invention overcomes many of these problems by providing a low cost flexible sensor architecture as will be described hereinafter.

The present invention relates generally to electronic sensor devices. Objects, advantages and features of the invention will become apparent to those skilled in the art upon consideration of the following detailed description of the invention.

In one exemplary embodiment of the present invention a sensor circuit operates under control of a controller circuit. The sensor circuit includes a front end circuit which receives an input signal from a sensor and amplifies the input signal to produce an amplified signal therefrom. A demodulator receives the amplified signal and converts the amplified signal to a digital signal. An interface circuit is coupled to the controller and relays operational parameters and commands from the controller to the demodulator and the front end circuit. An output circuit produces an output signal in response to commands from the controller.

A method of controlling a sensor operation to detect an event in accordance with an embodiment of the invention, includes in a controller, driving a sensor transmitter and acquiring sensor state information from an interface circuit at timed intervals; conducting an analysis of the sensor state information in the controller to determine if the event has occurred; and if the event is deemed by the controller to have occurred, taking a programmed action.

A method of controlling the operation of a sensor circuit in accordance with another exemplary embodiment of the invention includes providing an optical transmitter coupled to an output of the sensor circuit; providing an optical receiver coupled to an input of the sensor circuit; transmitting status information to a remote controller via the optical transmitter; and receiving optical information from the remote controller via the optical receiver.

A method of adjusting a sensor parameter in accordance with another embodiment of the invention includes detecting a first actuation of a switch for a period of time, said first actuation of the switch enabling an adjustment mode; detecting subsequent actuations of the switch occurring within a time window; and adjusting a sensor parameter in accordance with a switch actuation occurring within said time window.

A method of communication with a sensor using an optical remote controller in accordance with another exemplary embodiment of the invention includes receiving a sequence of light pulses from the optical remote controller representing a password; comparing the password with a stored reference password; and if the password equals the stored reference password, receiving a sequence of light pulses from the optical remote controller representing a first data word.

A method of manufacturing a sensor device according to an embodiment of the invention includes interfacing a controller circuit to a transceiver circuit, the transceiver circuit including a front end circuit; connecting a sensor to the front end circuit; and transmitting programming information to the sensor device through the sensor to establish operational characteristics of the sensor device.

The intelligent sensor platform as described in this summary and hereinafter is described in exemplary embodiments primarily using optical LED transmitter and receiver. However, the present platform is extremely flexible and can be used with other types of sensors such as audible, inductive, capacitive, ultrasonic, microwave, RF or other sensor types without departing from the invention.

BRIEF DESCRIPTION OF THE DRAWING

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawing in which:

FIG. 7 is a timing diagram of the Write and Read cycles of the present embodiment.

FIG. 8 is a timing diagram of inner loop and outer loop timing according to the flow chart of FIG. 6.

FIG. 10 is an example timing diagram for synchronization between a remote controller and the sensor.

DETAILED DESCRIPTION OF THE INVENTION

Figure 1:
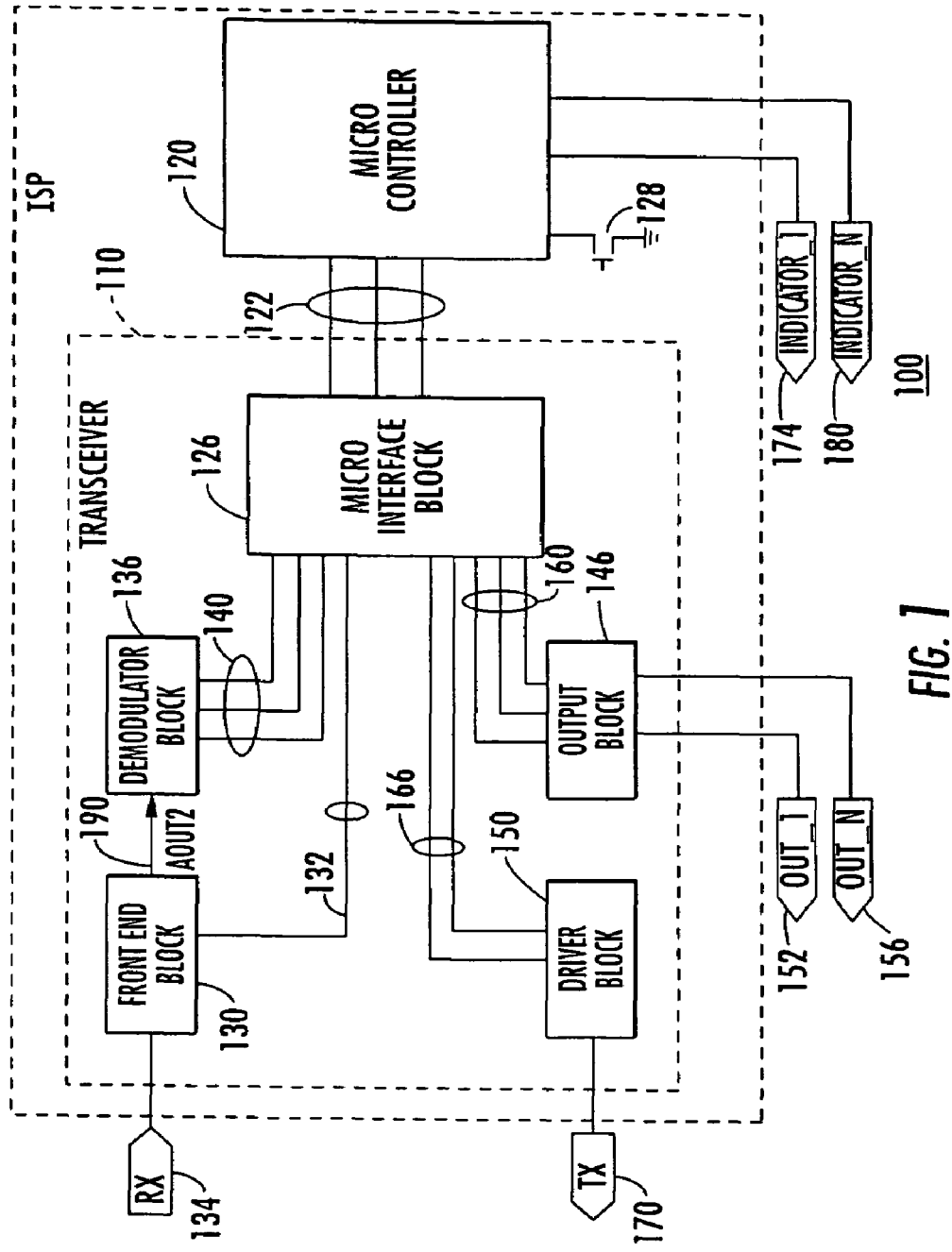
FIG. 1 is an overall block diagram of an embodiment of the Intellegent Sensor Platform of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Referring now to FIG. 1, an Intelligent Sensor Platform (ISP) in accordance with one embodiment of the present invention is shown generally as 100. This platform includes an integrated transceiver 110 in cooperation with a microcontroller 120. The microcontroller 120, may be a commercially available microcontroller such as the Microchip Technology Incorporated PIC12CE518 or PIC12CE519 microcontroller. This microcontroller is a RISC based microcontroller with on-board EEPROM. Other suitable microcontrollers can of course be used. Microcontroller 120 is connected to transceiver 110 via a 3-wire bi-directional serial interface. The 3-wire bi-directional serial interface 122 is connected to a microcontroller interface block 126. The microcontroller interface block 126 interfaces the microcontroller 120 with the remainder of transceiver 110. In certain embodiments, a switch 128 can also be coupled to the microcontroller 120 to effect programming of certain features, as will be described later.

The architecture of the ISP 100 is designed in such a way, as to take advantage of the inherent flexibility offered by an on-board microcontroller 120, while making good use of speed and efficiency offered by a custom silicon ASIC (Application Specific Integrated Circuit) implementation of transceiver 110 in the preferred embodiment. The transceiver 110 provides microcontroller 120 with direct access to, and control of, virtually all aspects of the physical interface. An embedded hardware sequencer reduces the microcontroller 120's interface to the transceiver 110 to a fully synchronous bi-directional bus. The simplicity of this interface, allows transceiver 110 to transfer the complete status of the physical interface and receive new configuration programming within a single bus cycle, thus allowing microcontroller 120 to have virtual real time control and monitoring of the physical interface. The synchronous nature of the interface reduces microcontroller 120 performance requirements by eliminating the need for interrupts or dedicated interface protocols. Integration of signal amplification, demodulation and direct fault output control, further simplifies minimum operating requirements for microcontroller 120, by eliminating the need for A/D and brown out protection required in other architectures. As the result of the above arrangement the ISP 100 is able to achieve all its performance objective while utilizing some of the simplest, smallest and least expensive processors on the market.

Communication between transceiver 110 and microcontroller 120 is accomplished, as previously described, via three (3) wire bi-directional serial interface between the microcontroller 120 and a microcontroller interface block 126. The direction of communication is established via a WrRd (write/read) line. The Write cycle (WrRd=H) allows the microcontroller 120 to configure the transceiver 110 for desired operation, while the Read cycle permits the microcontroller 120 to transceiver 110 through its acquisition cycle and read the resulting real time status of the transceiver 110.

The transceiver 110 includes a front end block 130 which operates under the control of control signals on lines 132 from microcontroller interface block 126 to receive inputs from the input terminal 134 and provide amplification to the input. Other processing such as, for example, bandpass, high pass or low pass filtering could also be provided in front end block 130 along with amplification. The amplifiers can provide, for example, linear, logarithmic, or other types of programmable gain and bandwidth functions in equal or unequal increments.

The output from front end block 130 goes to a demodulator block 136 which operates under the control of microcontroller interface block 126. Demodulator block 136 applies threshold detection to the analog signal provided by front end block 130. Microcontroller interface block 126 can be used via control from micro-controller 120 to establish thresholds for signal levels coming from front-end block 130. Information in the demodulator block 136 is digitized and stored via the interface 140 within latches in microcontroller interface block 126 and is available to the microcontroller 120 during the Read cycle so that this information can be accessed when requested by microcontroller 120.

Microcontroller interface block 126 also holds registers of information for output block 146 and driver block 150. Output block 146 can be used to drive one or more output lines such as 152 and 156 in any manner determined useful for the individual deployment of the ISP 100 at hand. For example, outputs 152 and 156 can drive NPN transistors or PNP transistors which in turn control relays or the like in order to implement an industrial process such as starting or stopping a motor, sounding an alarm, incrementing a counter or taking other suitable action. Control for output lines 152 and 156 are provided to output block 146 via an interface 160.

Driver block 150 is connected via an interface 166 to the microcontroller interface block 126. Driver block 150 drives one or more transmitter channel outputs such as 170 which can be used to apply a stimulus to a transmitter device such as a LED diode, or other transmitter compatible with the receiver device connected to terminal 134 (e.g. a magnetic, capacitive, photoelectric, microwave, etc.). Microcontroller 120 may also provide output signals shown as indicator one 174 and indicator N 180 which can be used to drive indicators or take any other programmable action within the capabilities of microcontroller 120.

The output block 146 can be designed to have multiple channels of output (for example two channels in the current implementation, but this should not be considered limiting). Using the example of two output channels, the output block may receive input signals from 160 connected to latches or flip flop outputs within the micro interface block 126. These inputs can drive driver circuits for providing output suitable for driving NPN or PNP transistors at 152 or 156 respectively. Using known circuit design techniques, the output can be configured under program control to provide complimentary or independent output dependent upon sensor condition and the state of the transceiver 110. The outputs 152 and 156, it should be noted, are controlled entirely by the microcontroller 110 based upon any desired set of conditions which can be programmed into the microcontroller, including, the states of the demodulator block 136 outputs after processing by any desired algorithm implemented in the microcontroller 120. Thus, for example, the microcontroller 110 could be programmed to produce an output at 152 only after a particular one or both thresholds have been exceeded for five consecutive clock cycles, or meets any other suitable condition based upon time and the input signal's state in comparison with the established thresholds.

In certain embodiments, it might be desirable to drive a transmitting device such as a light emitting diode with a signature modulation scheme. If this is desired, it is implemented using driver block 150 under the command of micro-controller 120 via interface 122. Indicators 174 and 180 may for example be a pair of light emitting diodes of differing colors with one indicating the presence of power and another indicating detection of a signal at 134. However, this is not to be limiting since such indicators can represent anything which can be programmed in microcontroller 120.

The transceiver 110 is preferably implemented as an Application Specific Integrated Circuit (ASIC) or custom integrated circuit to minimize size, cost and parts count in the overall system. The microcontroller 120 can be any commercially suitable microcontroller which suits the particular application at hand, such as, for example, the commercially available PIC12CE5xx series of microcontrollers available from Microchip Technology Inc., 2355 W. Chandler Blvd., Chandler, Ariz., USA 85224-6199. This series of microcontroller is particularly advantageous in many applications due to low cost, on board memory and clock, three line bidirectional interface, and RISC architecture having only thirty three instructions to learn.

Figure 2:
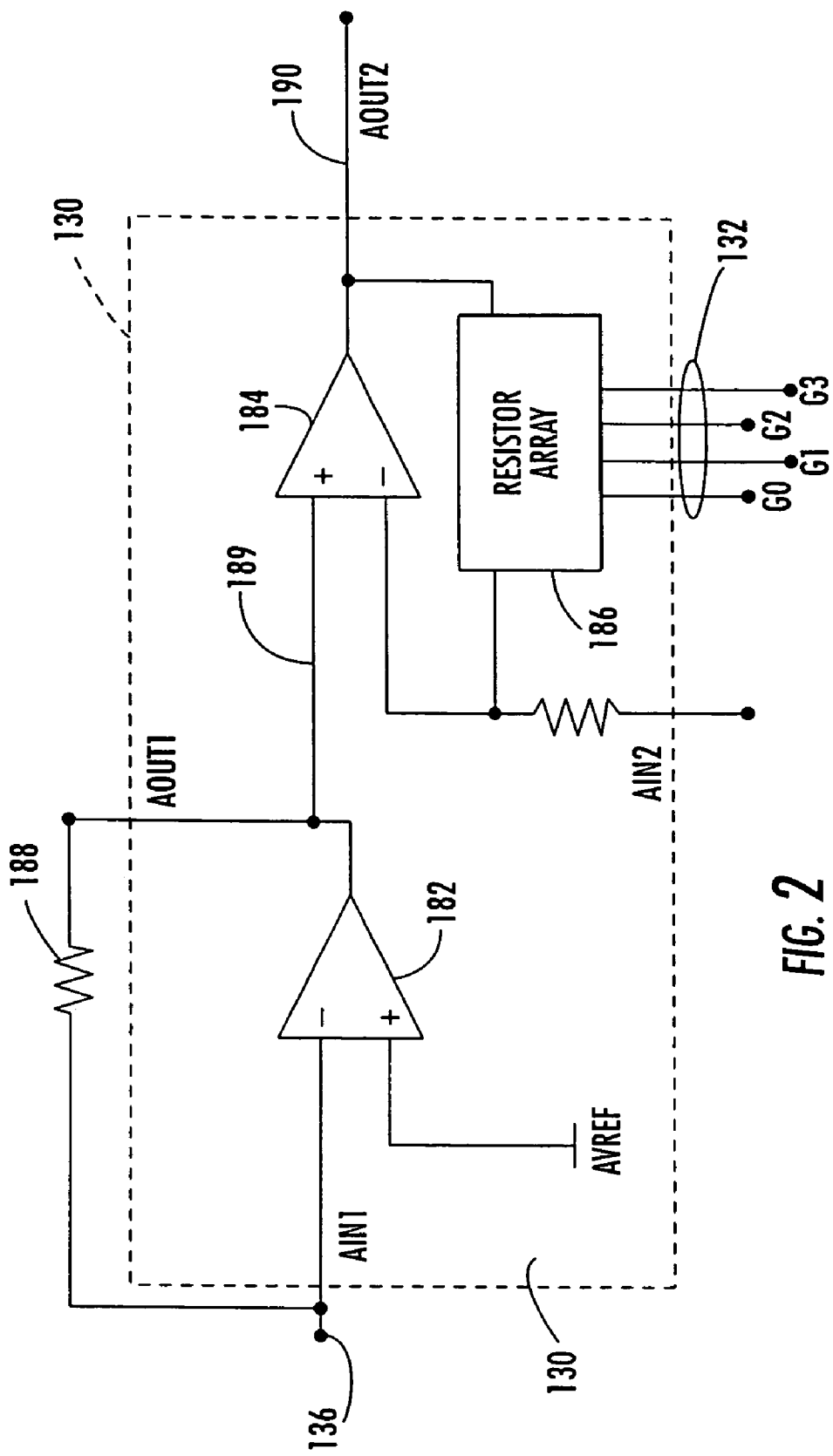
FIG. 2 is an example of a block diagram of a basic configuration of a front end block according to embodiments of the present invention.

Referring now to FIG. 2, the front end block 130, may be implemented using known analog and digital circuit design techniques. For example, front end block 130 may include one or more transconductance amplifier circuits 182 in series with one or more operational amplifier circuits 184 having on chip bias circuitry. An array of programmable feedback resistors 186 can be used to provide user programmable gain or transconductance for input signal at either one or more amplifier circuits. For example, in this embodiment, transconductance amplifier stage 182 is followed by gain stage 184 to provide multiple levels of programmable gain. For the transconductance amplifier, for example, gain can be selected by choice of external resistance 188 between AIN1 (the first stage input) and AOUT1 (the first stage output) to have gain between approximately 80 dB and 106 dB. The second amplifier stage 184 can, for example, be i to select gains between approximately 2 and 31 by selection among several values of feedback resistance in resistor array 186 connected between the second stage output (AOUT2) and it's inverting input 189. In the second amplifier stage 184, for example, several resistors can be provided in series with FET analog switches selectably shorting or tapping some or all of the resistors under program control to provide an array of possible gains, with gain steps of equal or unequal intervals. Those skilled in the art will appreciate that other configurations of adjustable gain are possible, and that the configuration of FIG. 2 is simply illustrative.

In the present embodiment, four bits are used to control the gain of amplifier 184. These bits are stored as G0–G3 in configuration registers of the interface block 126 and conveyed to front end block 130 via connection 132 to select the appropriate gain of amplifier 184 in front end block 130. Values of G0–G3 can be set by microcontroller 120 under program control or manual adjustment to select the desired gain characteristics for the front end block. The values of G0–G3 can be stored in registers programmed by the microcontroller 120 within the microcontroller interface block 126 to set and maintain the gain.

In one embodiment of the invention, the pushbutton momentary contact switch 128 of FIG. 1 can be used as a user input to the microcontroller 120 so that an initial press and hold of the switch initiates a gain programming mode which initializes the gain at an initialized value such as the last programmed gain (or alternatively at a minimum or maximum value). Each successive press of the switch can increment or decrement the gain by one or multiple steps. The direction of adjustment can be changed by depressing and holding the switch in the programming mode. Many variations are possible, such as initialization to a maximum or minimum, or even automatic gain in response to a particular sequence of pushbutton depressions, as will be evident to those skilled in the art given that this control function can be programmed as desired into microcontroller 120.

Figure 3:
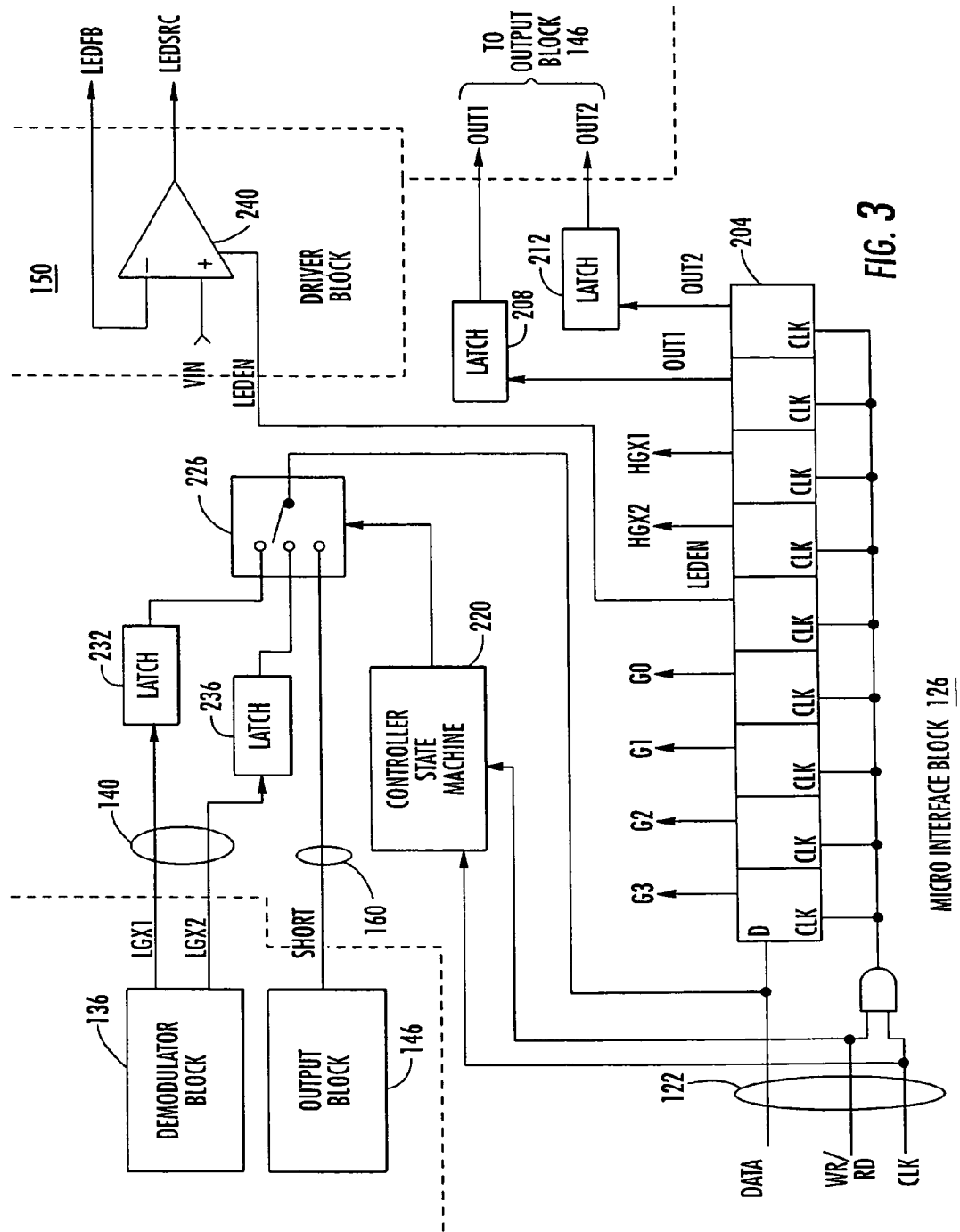
FIG. 3 is an example of a block diagram of a basic configuration of a microcontroller interface block and driver block according to embodiments of the present invention.

Referring now to FIG. 3, the basic functional circuits of an exemplary implementation of the microcontroller interface block 126 is shown. The three line interface 122 provides clock, data and Wr/Rd lines for use by the system in interfacing with the microcontroller 120. During a write cycle, data is clocked into a shift register 204 for storage.

The data clocked into register 204 is listed on TABLE 1 below. This data includes the gain control bits (G0–G3) for the front end block 130 amplifiers, an LED enable line LEDEN to turn on an LED (or other transmitter device) at the driver block 150, two threshold settings HGX2 and HGX1 for the demodulator block 136 and two programmable output bits OUT1 and OUT2. The outputs OUT1 and OUT2 are fully controlled by the Microcontroller 120 and are double latched in two latches 208 and 212 in order to provide stable output drive signals during the write cycle.

TABLE 1

| Register | Bit | Definition |
|----------|-----|------------|
| OUT2 | 0 | Output drive two (2) enable bit |
| OUT1 | 1 | Output drive one (1) enable bit |
| HGX1 | 2 | Detection threshold 1 |
| HGX2 | 3 | Detection threshold 2 |
| LEDEN | 4 | LED drive enable bit |
| G0 | 5 | Gain adjust bit 0 (Least significant bit) |
| G1 | 6 | Gain adjust bit 1 |
| G2 | 7 | Gain adjust bit 2 |
| G3 | 8 | Gain adjust bit 3 (Most significant bit) |

Read cycle (WrRd=L) allows microcontroller 120 to control the timing of an internal controller state machine 220. The internal controller state machine 220 is responsible for the overall operation of the transceiver 110, including control of the operational sequence (via controller state machine 220), configuration register update (TABLE 1), and status registers (TABLE 2) serial output sequence. Of course, those skilled in the art will appreciate that the present clock cycle and bit assignments of TABLE 2 and TABLE 1 can be modified as desired to adapt the sensor's operation to other conditions. That is, for example, a two, three or eight cycle clock could be used in other embodiments or additional information can be shifted into or out of the microcontroller interface block 126 in other embodiments without departing from the invention.

TABLE 2

| CLK cycle | Register | DATA |
|-----------|----------|------|
| 0 | SHORT | Short circuit detector |
| 1 | SHORT | Short circuit detector |
| 2 | LGX1 | Excess gain one (1) detector |
| 3 | LGX2 | Excess gain two (2) detector. |

The internal states of the controller state machine 220 change on each negative transition of the clock signal CLK. The signal CLK is provided as a divided clock signal from the microcontroller's internal clock and is under complete programming control from the microcontroller 120. Each state is valid throughout the duration of a given clock cycle. The clock cycles do not have to be equal or symmetrical, thus providing microcontroller 120 with direct control of the LED pulse and Hold interval duration, allowing optimum signal recovery for a chosen Front End bandwidth.

TABLE 3 below shows the operational state for each clock cycle.

TABLE 3

| CLK cycle | Controller State Machine | Internal operation |
|---|---|---|
| 0 | 00 | Sample front end output. |
| 1 | 01 | LED drive ON. |
| 2 | 11 | LED drive OFF. Sample front end output. Double latch OUT1 and OUT2. |
| 3 | 10 | |

During a read cycle, the microcontroller takes the WR/RD line high. This is received by the controller state machine 220 which switches, using switches 226, the desired information onto the Data line of 122. In this example, during the first two cycles, a signal from the output block 146 (SHORT) is passed to the data line as an indication of whether or not a short circuit condition exists in either of the output lines OUT1 or OUT2. Since OUT1 and OUT2 are under control of the microcontroller 120, the microcontroller can determine which output has a short condition and take remedial action if needed (e.g. turn off the output, or analyze the situation to determine if the situation is transient or presents a danger of damage to the output transistors). During the third clock cycle, the switch 226 is directed by controller state machine 220 to switch the contents of latch 232 containing the signal LGX1 to the data line to be read by the microcontroller 120. Similarly, during the fourth clock cycle, the switch 226 is directed by controller state machine 220 to switch the contents of latch 236 containing the signal LGX2 to the data line to be read by the microcontroller 120. The signals LGX1 and LGX2 are the outputs of two threshold detectors from demodulator block 136.

The output signals OUT1 and OUT2 as well as LEDEN (LED ENable) are under the direct control of the microcontroller 120 as are the gain control bits G0–G3 and two threshold set bits HGX1 and HGX2. Each of these signals is loaded into shift register 204 during the write cycle established by the microcontroller 120. The LEDEN signal enables driver block 150. The driver block 150 provides a line driver amplifier 240 for driving an output such as a transistor switch for turning on and off an LED transmitter at the LEDSRC terminal. The input to the line driver amplifier 240 can be a simple DC level (e.g. from an internal 1.25 volt voltage regulator) which causes the output LED-SCR to go high when the amplifier is enabled, or it can be a more complex signal as required to drive an LED or other transmitter transducer in a more complex mode of operation. Although the signal is labeled as an LED enable signal, this should not be considered limiting, since this signal, under the control of microcontroller 120, can be used for driving any number of devices including audio, photoelectric, ultrasonic, microwave, capacitive, magnetic, etc. sensors transmitters. The LEDFB terminal can be used to provide a feedback signal from the external circuit being driven.

Figure 4:
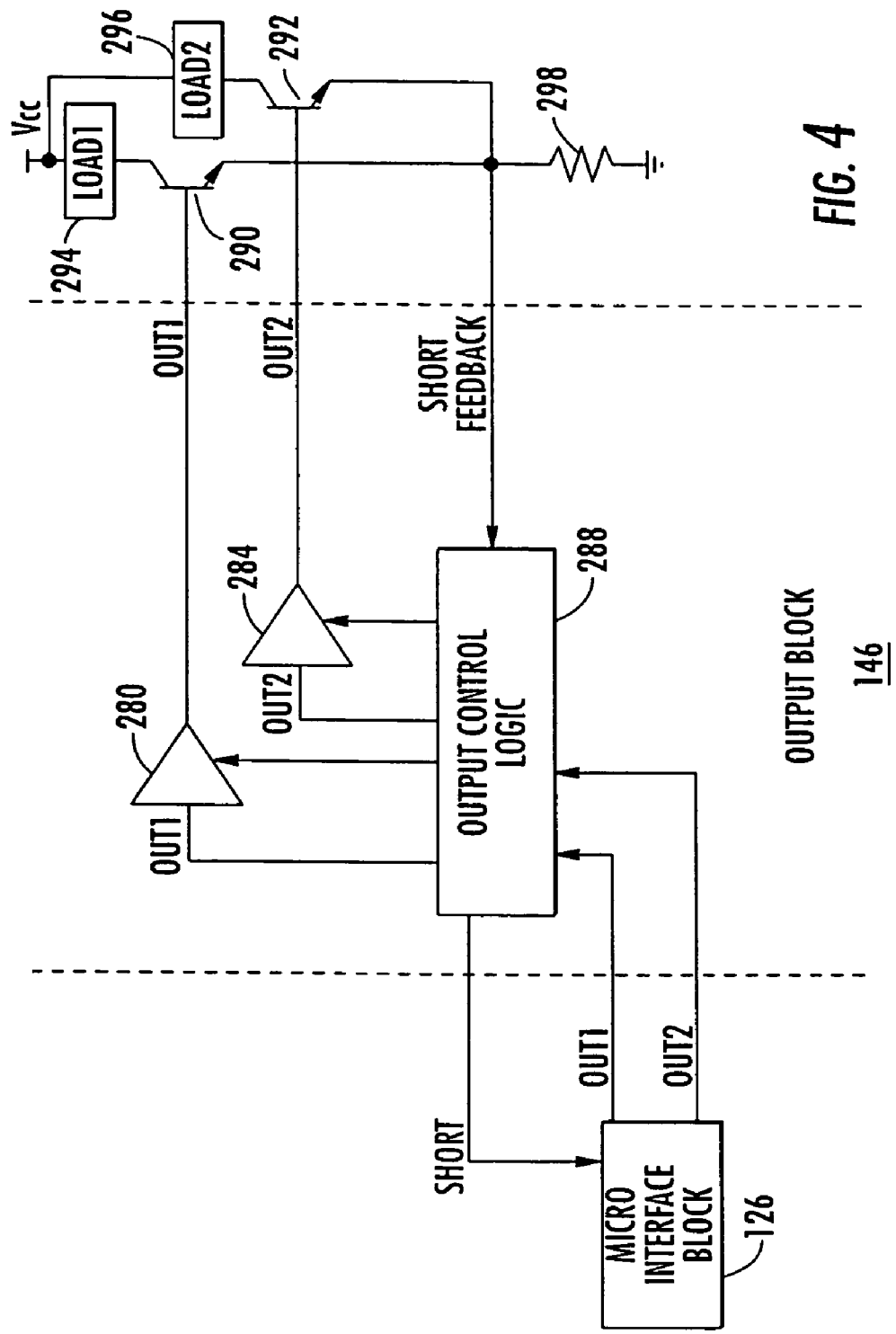
FIG. 4 is an example of a block diagram of an output block according to embodiments of the present invention.

Referring now to FIG. 4, an exemplary output block in accordance with the invention is shown. The output block 146 receives signals OUT1 and OUT2 from registers in the microcontroller interface block 126 (as loaded by the microcontroller 120) and produces outputs at the transceiver terminals OUT1 and OUT2. These outputs are provided via driver amplifiers 280 and 284 under the control of output control logic 288. The transceiver 110 is provided with a terminal for providing feedback to the output control logic which can be used to determine whether or not a short circuit is currently applied to the output transistors. FIG. 4 shows one example use of these outputs OUT1, OUT2 and input SHORT. In this example, external output NPN transistors 290 and 292 respectively drive two collector loads 294 and 296 and share a common emitter resistor 298 to ground. The SHORT feedback terminal is connected to the junction of the emitters and the resistor 298. If one or both of the transistors 290 or 292 is drawing too much current, the voltage at SHORT feedback is detected as increasing beyond acceptable limits. Output transistors are current limited by action of amplifiers 280 and 284 to prevent runaway effects and the microcontroller 120 is alarmed to the fault during the Read interval, allowing it to take appropriate action. For example, a single overload condition on clock cycle 1 might be ignored as a transient even, but after several in a row, the microcontroller 120 might shut down the output and sound an alarm via indicator lines 174 or 180.

Figure 5:
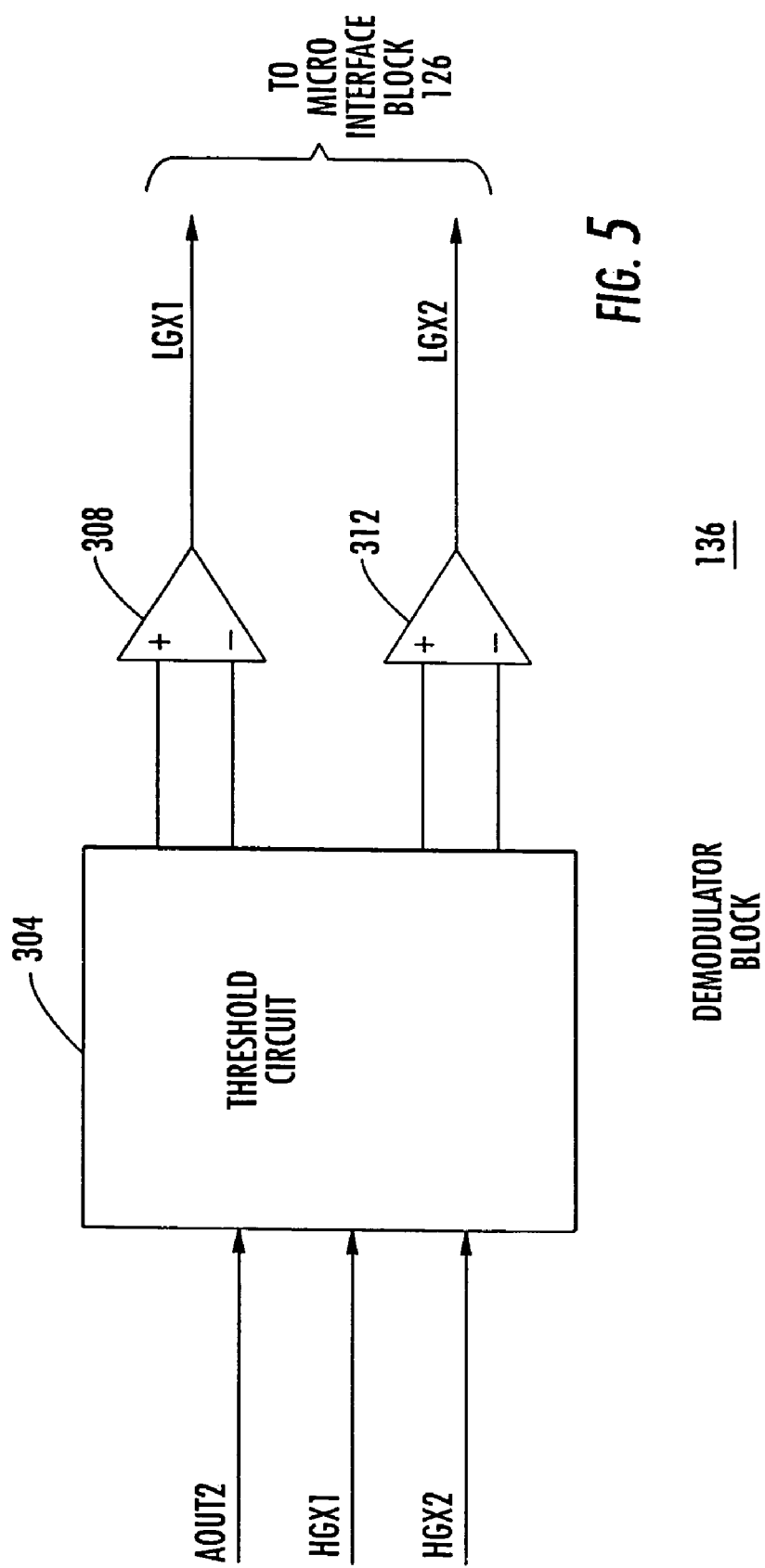
FIG. 5 is an example of a block diagram of a demodulator block according to embodiments of the present invention.

Referring now to FIG. 5, an example of the demodulator block 136 is shown. In this example, the AOUT2 signal (output of the second amplifier stage) from the front end block 130 is provided to a threshold circuit 304 which establishes thresholds and hysteresis based upon input from the microcontroller 120. Circuit 304 receives binary inputs from the micro interface block 126 HGX1 and HGX2 which establish the values of two separate thresholds used for comparison with the output of the front end block. In this example embodiment, the threshold set for HGX1 and HGX2 can be set as in TABLE 4 below:

TABLE 4

| PARAMETER | MINIMUM VALUE | MAXIMUM VALUE |
|---|---|---|
| HGX1 Threshold | | |
| HGX1 = High | 103 Millivolts | 109 Millivolts |
| HGX1 = Low | 83.5 Millivolts | 88.5 Millivolts |
| Hysteresis | 18.9% | 18.8% |
| HGX2 Threshold | | |
| HGX2 = High | 206 Millivolts | 208 Millivolts |
| HGX2 = Low | 178 Millivolts | 187 Millivolts |
| Hysteresys | 15.7% | 14% |

By use of the programmable hysteresis in cooperation with the programmable gain of the front end block, the microcontroller 120 makes intelligent decisions under program control using any suitable algorithm to determine if specified conditions have been met. For example, the combination of a lower threshold output followed by a higher threshold output within a specified time with the higher threshold output having a specified duration can be used as a positive indication of the occurrence of a specified event. In other applications, multiple thresholds can be used as an indication of performance degradation. For example, failure to meet a higher threshold might indicate a dirty lens on an optical sensor or deteriorating output or misalignment from a transmitting device.

Figure 6:
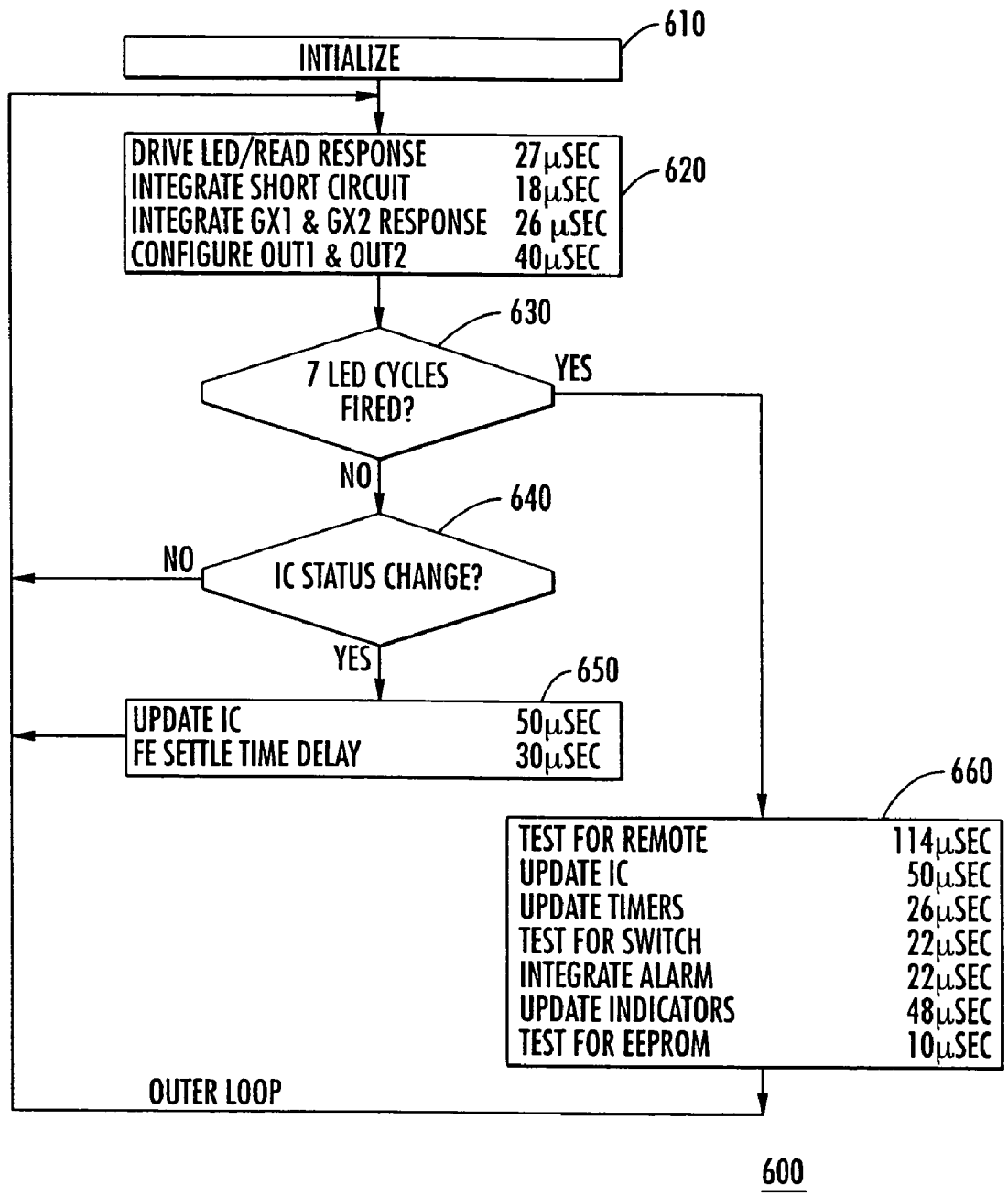
FIG. 6 is a flow chart of the overall operational cycles of an example embodiment of a sensor according to the present invention.

Referring now to FIG. 6 viewed in conjunction with FIG. 7 and FIG. 8, the Read and Write cycles of the present implementation are described. In certain embodiments of the present invention, an initialization process such as that shown as 600 in FIG. 6 can be used to initialize and maintain operation of the ISP 100. In this process, it is assumed that a photoelectric sensor configuration is in use with a diode being driven at terminal 170 and a photo sensor receiving signals at 134. The initialization process begins at 610 and passes to 620 where the LED is driven by the driver block 150 and a response is read at the front end block 130. The short circuit signal SHORT is checked repeatedly over a period of time (e.g. 18 microseconds), that is, they are integrated, to determine if there is a short circuited output. The output responses GX1 (HGX1) and GX2 (HGX2) are integrated and OUT1 and OUT2 are configured.

The read cycle repeats itself in this embodiment for seven consecutive cycles with the LED drive signal LEDEN (or LEDDR) being driven during the second of every four clock cycles as shown in FIGS. 7–8. If 7 LED cycles are not fired at 630 and no IC status has changed at 640, control returns to 620. If the IC status has changed at 650 then the IC is updated and after a settling time at 650 control returns to 620. After 7 LED cycles at 630, the process passes to 660 where a test for presence of a remote control signal is conducted, the IC is updated, timers are updated, a switch is tested, alarms are integrated, indicators are updated and the EEPROM is tested. During this phase (referred to as the outer loop when control passes to 660), the processor enters a phase of looking for reprogramming from either a remote control device (e.g. and infrared transmitter) or from switch 128 as will be described later.

Referring again to FIG. 7, configuration data is conveyed to the microcontroller interface circuit via the three line bidirectional interface by the microcontroller 120 causing the Wr/Rd line high. One bit of information is passed over the data line during each of the next nine clock cycles to fill the registers 204 with configuration data from the microcontroller 120. During a read cycle, the microcontroller 120 pulls the Wr/Rd line low and reads status information one bit per clock cycle from the micro controller interface as described in conjunction with the description of FIG. 3.

With reference to FIG. 8 and FIG. 6, the inner and outer loop processing occurs during the times indicated in FIG. 8. The inner loop provides the time for the microcontroller to read the various input signals resulting from enabling the transmitter. The outer loop represents a time when a window is provided for receipt of signals from a remote control mechanism as shown. This mechanism will be described in greater detail later.

Figure 9:
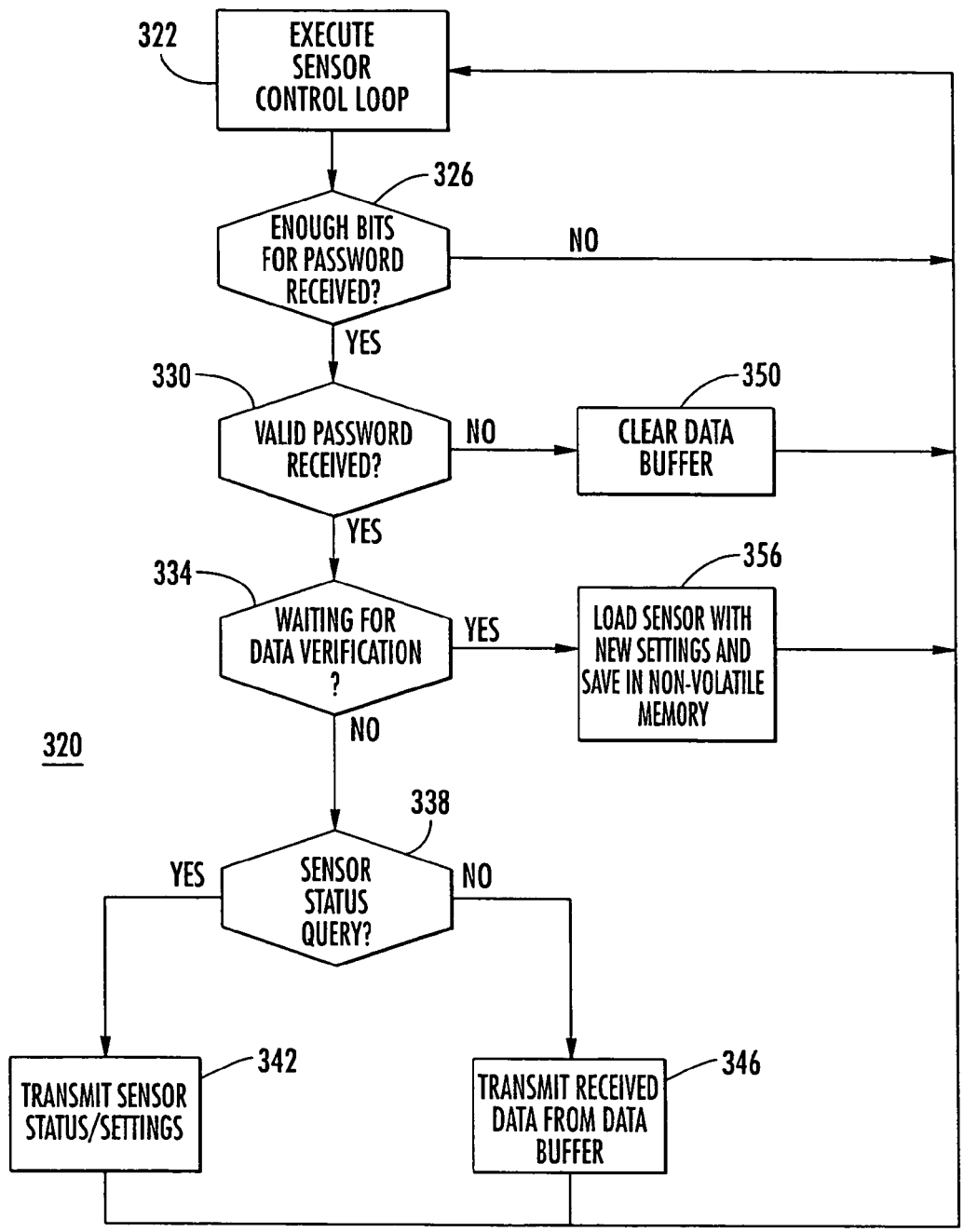
FIG. 9 is a flow chart describing an example of communication with the sensor using a remote controller.

Referring now to FIG. 9, an example embodiment of the communication flow between the sensor and a remote control device is shown as process 320 which begins with execution of the sensor control loop at 322. If enough bits for a password have been received at 326, and a valid password is received at 330, control passes to 334. If at 334 the system is not waiting for data verification then control passes to 338. At 338, if the sensor status is being queried then the sensor status and/or settings is transmitted at 342. If the sensor status is not being queried at 338 then received data is transmitted from the data buffer in 346.

If at 330, a valid password is not received, the data buffer is cleared at 350 and control returns to 322. If at 334 the system is waiting for data verification, then the sensor is loaded with new settings which are saved in non-volatile memory at 356 and control passes back to 322.

Figure 11:
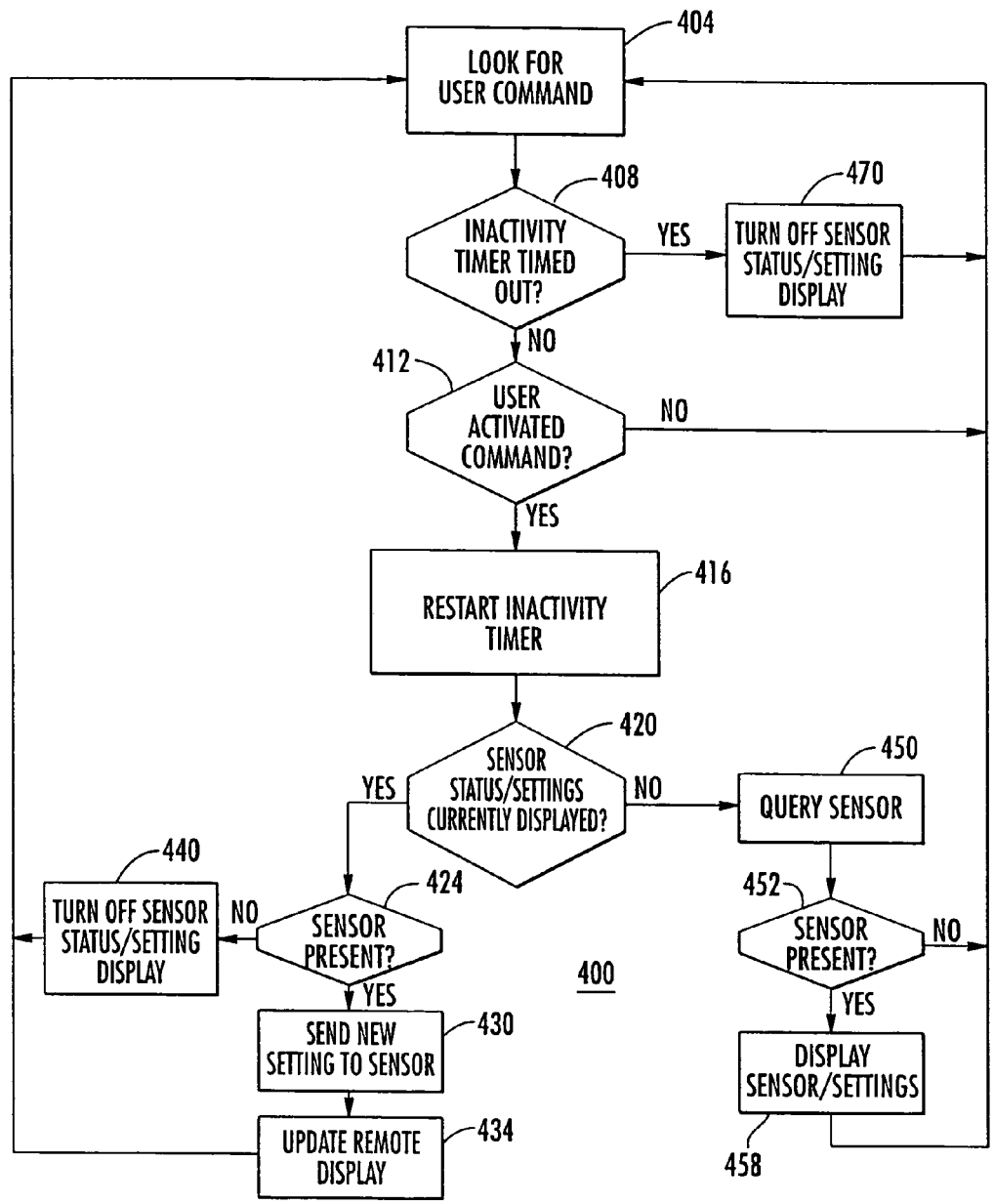
FIG. 11 is a flow chart of an example remote controller user interface.

Referring to FIG. 10, a timing diagram shows the communication timing from the sensor to a remote controller. Referring to FIG. 11 in conjunction with FIGS. 9–10, a remote user interface 400 is described. At the remote user interface, 404 looks for a user command. If an inactivity timer has not timed out at 408 and a user command is activated at 412, the inactivity timer is restarted at 416. If a user has not activated a command at 412, control returns to 404. After the inactivity timer is restarted at 416, control passes to 420. At 420 if sensor status and settings are currently displayed control passes to 424. At 424 if a sensor is present then new sensor settings are sent to the sensor at 430 and the remote display is updated at 434. After 434 control returns to 404. If no sensor is present at 424, the sensor status settings display is turned off at 440 and control returns to 404.

If at 420, sensor status/settings are not currently displayed, the sensor is queried at 450. If no sensor is present at 452 control returns to 404. If a sensor is present at 452, the sensor settings are displayed at 458 and control returns to 404. If at 408, the inactivity timer has timed out, control passes to 470 where the sensor status/setting display is turned off. Control is then passed back to 404.

Figure 12:
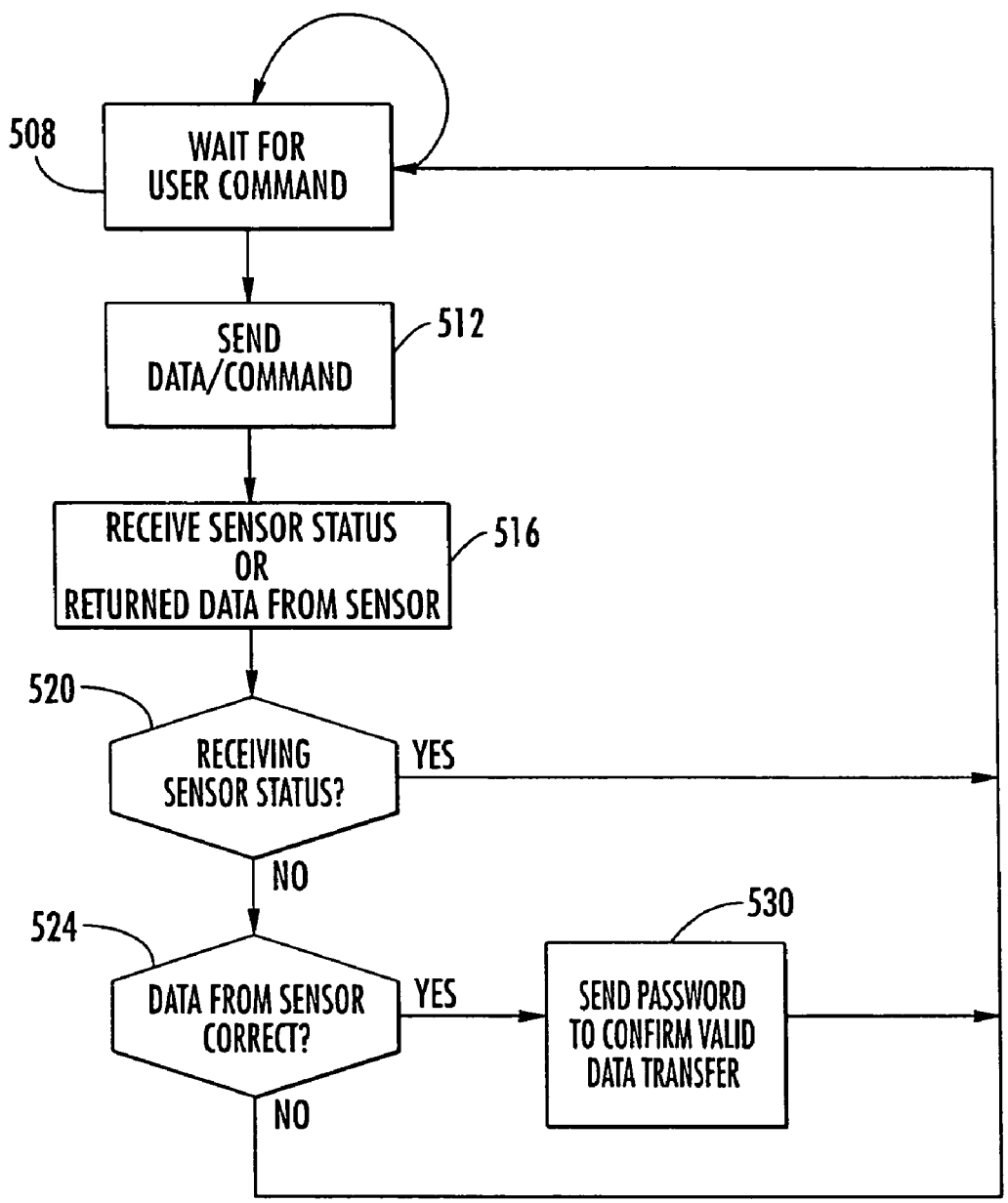
FIG. 12 is a flow chart of an example communication flow between a remote controller and a sensor in accordance with embodiments of the present invention.

Referring now to FIG. 12 viewed together with FIGS. 7–11 a remote communication flow in accordance with certain embodiments of the invention is shown as process 500. Briefly, at 508, the system awaits a user command. At 512 data/commands are sent. At 516 either sensor status is received or data is returned from the sensor. At 520, if sensor status is being received, control returns to 508. If sensor status is not being received at 520, control passes to 524 where returned data from the sensor is examined to determine if it is correct. If not, control passes back to 508. If so, control passes to 530 where the password is sent to confirm valid data transfers. Control then returns to 508.

In greater detail, remote programming can be readily implemented in certain embodiments of the present invention to provide non-contact bi-directional communication between a remote control and a sensor. In the present implementation, the remote control function set includes, but is not limited to, the following functions: upload and display of sensor status and all user programmable settings; adjustment and download of existing sensor parameters with minimal interruption to normal sensor operation; settings, adjustments, and queries performed on sensors where access to adjustment controls is difficult or where no external controls/indicators are available; reduction or removal of external controls and/or indicators from sensor configuration for cost reduction and a decrease in environmental protection constraints; display of sensor parameters/status which cannot normally be displayed with typical sensor resources; transmit and receive sensor data with same elements used for sensing; and, communication with sensors using either synchronous or asynchronous modulation/demodulation.

One embodiment of remote programming for the ISP 100 uses the existing sensor photoelements to communicate with and control a synchronous photoelectric sensor. A programming operation queries the sensor, displays the current settings, then allows adjustment based on the reported settings. Some of the parameters that can be controlled and displayed by the remote are shown in TABLE 5 below.

TABLE 5

| Parameter | Adjust/Indicate on Sensor |
| --- | --- |
| Gain | Yes |
| Lt/Dk Operate (i.e. polarity of output LED drive) | No |
| Complementary Output Mode | Yes |
| Mirrored Output Mode | No |
| Alarm Output Mode | Yes |
| Gx/Beam Status Indication | Indicator only (Select with remote) |
| On Delay | No |
| Off Delay | No |

The implemented communication protocol minimizes overhead in sensor code space and normal operation execution time through use of existing drivers for communication and receiving data in the normal operating loop without interruption to sensing functions. The protocol also provides a high level of data security with extensive password requirements, preventing parameter corruption or interruption of normal sensor operation from false entry into program mode in a noisy environment.

While the programmer is establishing communications by sending the required password and data bytes, sensor operation remains unaffected as illustrated in FIGS. 8–9. Normal sensor operation takes place for seven Read cycles with a window for checking for remote input signals taking place every eighth cycle. During this eighth cycle, one bit of data is passed either to or from the remote controller. Only when a valid password has occurred at 330, and 3 bytes of data have been received is normal operation interrupted while the sensor transmits its current parameter status or received data buffer for verification.

The communication sequence for this embodiment is as follows. Two commands, query, and parameter load are used by the remote to receive and send data. When the remote receives a user input at 404 of FIG. 11, the query command is used to gain current sensor status at 512 of FIG. 12 while the remote parameter display is off. Once the current sensor status has been acquired and is displayed at 458, the parameter settings can be modified and transmitted to the sensor using the parameter load command. For either command the Initialization, Password and Data bytes are transmitted one bit per sensor loop (outer loop of FIG. 6) during the sensor remote sample window. Following data transmission, the sensor reads the first data byte to determine what data will be transmitted to the remote. If the first byte is FF Hex (query command) then the sensor sends 3 bytes containing the current sensor parameter settings. If the first byte is other than FF Hex (parameter load command) then the sensor transmits the 3 received data bytes held in a buffer for the remote to verify. The remote then sends the 8 bit password if the data received is verified at 530 as the data sent. When the sensor receives a valid password at 330 in response, the data buffer contents are loaded into the working registers which control sensor operation and the new parameters are written to non-volatile memory at 356. If a valid password is not received from the remote at 330 the data buffers are cleared and current sensor parameters are left unaffected at 350.

The data structure used is as follows:

| Zero Word | | | | | | | |
|---|---|---|---|---|---|---|---|
| 0 | 0 | 0 | 0 | 0 | 0 | 0 | 0 |

| One Word | | | | | | | |
|---|---|---|---|---|---|---|---|
| 1 | 1 | 1 | 1 | 1 | 1 | 1 | 1 |

| Password | | | | | | | | |
|---|---|---|---|---|---|---|---|---|
| 1 | PW MSB | PW bit7 | PW bit6 | PW bit5 | PW bit4 | PW bit3 | PW bit2 | PW LSB |

| IF Query Command THEN Data Byte 1 | | | | | | | | |
|---|---|---|---|---|---|---|---|---|
| 1 | 1 | 1 | 1 | 1 | 1 | 1 | 1 | 1 |

| IF Parameter Load Command THEN Data Byte 1 | | | | | | | | |
|---|---|---|---|---|---|---|---|---|
| 1 | Gx/Be am | Lt/Dk | Config 2 | Config 1 | Gain 3 | Gain 2 | Gain 1 | Gain 0 |

| -continued | | | | | | | | |
|---|---|---|---|---|---|---|---|---|
| Data Byte 2 | | | | | | | | |
| 1 | On dly 8 | On dly 7 | On dly 6 | On dly 5 | On dly 4 | On dly 3 | On dly 2 | On dly 1 |
| Data Byte 3 | | | | | | | | |
| 1 | Off dly 8 | Off dly 7 | Off dly 6 | Off dly 5 | Off dly 4 | Off dly 3 | Off dly 2 | Off dly 1 |

The sensor LED pulse pattern provides a unique signature which allows the remote to track and synchronize with the sensor. The remote programmer monitors the pattern and timing of the transmitted source LED pulse train. At a predefined moment in the sensor pulse train pattern the sensor opens a compare window to allow remote communications. The window 800 as shown in FIG. 8 and FIG. 10 is opened by performing a sample and compare of the front end response without firing the source LED. The programmer inserts an LED pulse during the compare window to transmit a logic "1" and omits a pulse to transmit a logic "0" at 810 as shown in FIG. 8 and FIG. 10.

During normal operation sensor opens detection window 800 at a given point during each period of a sensing cycle which allows a single bit of the multi bit password and data to be transmitted by the remote without interrupting sensor operation (1 bit per sensor period). Sensor operation does not get interrupted until a complete password plus data is received and the password is verified.

Referring to FIG. 10, during sensor data transmission normal operation is interrupted. The sensor sends a sync pulse 820 followed by a data bit 830 in the form of a pulse for a logic "1" and no pulse for a logic "0". Existing routines for normal sensor operation are used which minimizes sensor code overhead. Data are transmitted at a much greater rate than received because a full sensor loop does not have to execute prior to sending a single data bit In an application where sensor operation cannot be interrupted during any phase of remote programming, the protocol can be modified to perform bit transmission during the time in the sensor loop when data is received. This implementation requires greater code overhead and increase data transmission time.

While the embodiment described uses a photoelectric transmitter and receiver for communication between the remote and the sensor, many variations are possible. For example: an Inductive ISP based sensor with an inductive element used for remote programming; an inductive ISP based sensor can include an optical interface for remote programming; a capacitive ISP based sensor with capacitive element used for remote programming; a capacitive ISP based sensor with optical interface can be used for remote programming; a passive Infrared ISP based sensor with existing photodetector and additional LED used for remote programming; a passive Infrared ISP based sensor with optical interface used for remote programming; an ultrasonic ISP based sensor with ultrasonic transducer used for remote programming; an ultrasonic ISP based sensor with optical interface for remote programming; an RF ISP based sensor with existing RF elements used for remote programming; an RF ISP based sensor with optical interface for remote programming; etc.

Referring to FIG. 10, a timing diagram shows the communication timing from the sensor to a remote controller. Referring to FIG. 11 in conjunction with FIGS. 9–10, a remote user interface 400 is described. At the remote user interface, 404 looks for a user command. If an inactivity timer has not timed out at 408 and a user command is activated at 412, the inactivity timer is restarted at 416. If a user has not activated a command at 412, control returns to 404. After the inactivity timer is restarted at 416, control passes to 420. At 420 if sensor status and settings are currently displayed control passes to 424. At 424 if a sensor is present then new sensor settings are sent to the sensor at 430 and the remote display is updated at 434. After 434 control returns to 404. If no sensor is present at 424, the sensor status settings display is turned off at 440 and control returns to 404.

If at 420, sensor status/settings are not currently displayed, the sensor is queried at 450. If no sensor is present at 452 control returns to 404. If a sensor is present at 452, the sensor settings are displayed at 458 and control returns to 404. If at 408, the inactivity timer has timed out, control passes to 470 where the sensor status/setting display is turned off. Control is then passed back to 404.

Referring now to FIG. 12 viewed together with FIGS. 7, 8 and 10 a remote communication flow in accordance with certain embodiments of the invention is shown as process 500. At 508, the system awaits a user command. At 512 data/commands are sent. At 516 either sensor status is received or data is returned from the sensor. At 520, if sensor status is being received, control returns to 508. If sensor status is not being received at 520, control passes to 524 where data from the sensor is examined to determine if it is correct. If not, control passes back to 508. If so, control passes to 530 where the password is sent to confirm valid data transfers. Control then returns to 508.

ISP 100 provides the user with a wide range of novel interface options such as: remote control (discussed above); multi-mode digital push-button control; and multi-mode LED feedback display. Digital push-button 128 or push-buttons can be employed to program all of the same ISP features that are accessible by the remote control. An LED on the ISP 100 for example driven by the indicator output 174 can be used to provide user with the visual feedback as to which feature is being accessed and particular level or state of the feature in the programming cycle. As one example the user can program sensor sensitivity, with an LED flashing rate providing proportional feedback that reflects sensor sensitivity setting. As another example, in a secure environment the user might be required to input programming sequences within particular time intervals, which will be indicated (timed out) by on board LED display.

TABLE 6 below summarizes a form of push-button programming which can be provided via switch 128.

TABLE 6

| | |
|---|---|
| Single Click (t < 1 sec) | IF Adjust mode Indication inactive: Activate Gain display mode (overrides Pwr/SC display) No gain adjustment Start 4 sec gain indication hold timer ELSE IF Gain Indication Active: Step gain register according to gain direction flag Restart 4 sec gain indication hold timer Gain register will freeze at max/min setting until update direction is changed by sustained switch depression ELSE IF Output mode Indication Active: Toggle output mode between Normal (Cmpl/Mirror) and Alarm Restart 4 sec Output mode indication hold timer |
| Sustained Depression | IF Gain Indication inactive: Activate Gain display mode (overrides Pwr/SC display) |

TABLE 6-continued

| | |
|---|---|
| (1 sec < t < 4 sec) | No gain adjustment No direction change Start 4 sec gain indication hold timer ELSE IF Gain Indication Active: Reverse current gain step direction No gain adjustment Restart 4 sec gain indication hold timer |
| Extended Depression (t > 4 sec) | IF Output mode Indication inactive: Activate Output setting display mode (overrides Beam/Out display) No output mode change Start 4 sec output mode indication hold timer Output mode Indication Active: Toggle output mode between Normal (Cmpl/Mirror) and Alarm Restart 4 sec Output mode indication hold timer |
| Inactive | Gain direction is left in current state, then set to increment following 32 sec of inactivity Gain display mode disabled following 4 sec of inactivity On Power-Up Gain direction is set to increment |

The indicator lines 174 and 180 from microcontroller 120 can be used to drive two LEDs to provide feedback to the user on the programming operation. The operation of the LEDs can, for example, be programmed as shown in TABLE 7 below:

TABLE 7

| | |
|---|---|
| Sig < Gx1 | Indicator 1 off |
| Gx1 ≦ Sig < Gx2 | Indicator 1 Flashing, Dim/Bright |
| Sig ≧ Gx2 | Indicator 1 On, Bright |
| Power-on | Indicator 2 On, Bright |
| Short Circuit | Indicator 2 Flashing, On/Off |
| Gain setting | Indicator 2 Flashing, Dim/Bright proportional to setting Solid Dim at min gainSolid Bright at max gainGain indication remains active 4 sec following last switch operation Gain indication over rides Pwr/SC indication |

The remote control feature of the present invention is a feature which is normally only available in high end sensor devices costing 20 to 100 times more than the present ISP 100 to manufacture. Moreover, such programmable devices are typically quite large (8–10 times the size of ISP) sensors. Due to the large size and cost of such sensors its market penetration has been insignificant. ISP allows factory or field remote programming and control with the same hardware platform, at the same manufacturing cost as non programmable ISP models.

The following functions currently can be placed under remote control using embodiments of the present invention: I/O Logic and Timing, complimentary, Mirror, Alarm, Delays, any other output function, sensitivity, Detection Threshold, LED strengths, Detection Hysteresis, response time. processing filter profile, indicator LED functional profile, sensor profile opposed or synchronous, windowing thresholds, Teach/Learn mode selections. The ability of ISP to offer remote programmability in small, inexpensive package makes penetration of remote control into sensor market practical and attractive for both manufacturers and users.

Thus the architecture of the ISP is designed in such a way, as to take maximum advantage of inherent flexibility offered by an on-board microcontroller 120, while making best use of speed and efficiency offered by custom silicon (transceiver 110). The transceiver 110 provides microcontroller 120 with direct access to, and control of, all aspects of physical interface. Embedded hardware sequencer reduces microcontroller 120 to transceiver 110 interface to a fully synchronous bi-directional bus. The simplicity of interface, allows transceiver 110 to transfer complete status of the physical interface and receive its new configuration programming within a single bus cycle, thus allowing microcontroller 120 to have real time control and monitor of the physical interface. Synchronous nature of the interface reduces microcontroller 120 performance requirements by eliminating the need for interrupts or dedicated interface protocols. Integration of signal amplification and demodulation and direct fault output control, further simplifies minimum operating requirements for microcontroller 120, by eliminating the need for A/D and brown out protection. As the result of the above optimization ISP is able to achieve all its performance objective while utilizing the simplest, smallest and least expensive processors on the market.

The architecture of the ISP 100 of the present invention has dramatic size and manufacturing cost improvement over known alternatives and, by virtue of microcontroller 120 control, provides a flexible platform for a single device to provide multiple cost and size effective applications. It is anticipated that the present invention's sensor control capabilities can be substantially enhanced in other embodiments. For example, the configuration registers can be expanded and enhanced to include without limitation, drive levels, detection threshold, excitation frequency, short circuit/overload levels, indicator status, and variable hysteresis settings to name but a few. The status register options could also be expanded and enhanced without limitation by, for example, multiple levels of detection, noise magnitude, noise profile, A/D conversion, device ID. Those skilled in the art will recognize that other such enhancements are possible without departing from the present invention.

Many variations for use of the present platform are possible. For example, consider FIGS. 13–26 which briefly illustrate the flexible way in which the intelligent sensor platform 100 can be deployed.

Figure 13:
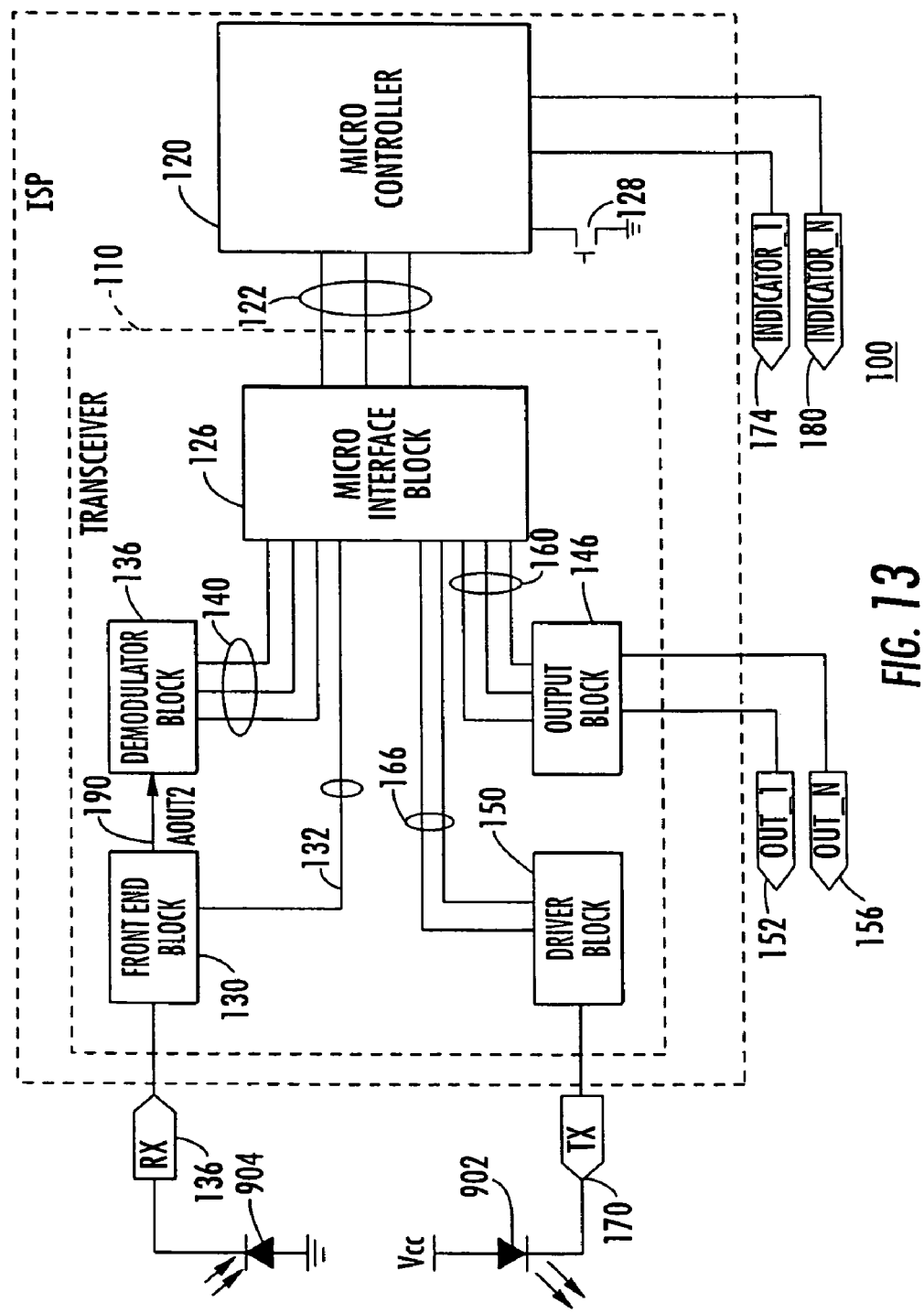
FIG. 13 is an overall block diagram of an embodiment of the Intelligent Sensor Platform of the present invention implementing a synchronous photoelectric sensor.

FIG. 13 shows an overall block diagram of an embodiment of the Intelligent Sensor Platform of the present invention implementing a synchronous photoelectric sensor. In this embodiment, the driver block 150 drives a light emitting diode (LED) 902 during the LEDEN period to produce a light beam which is detected by a photodiode 904 which drives the front end block 130.

Figure 14:
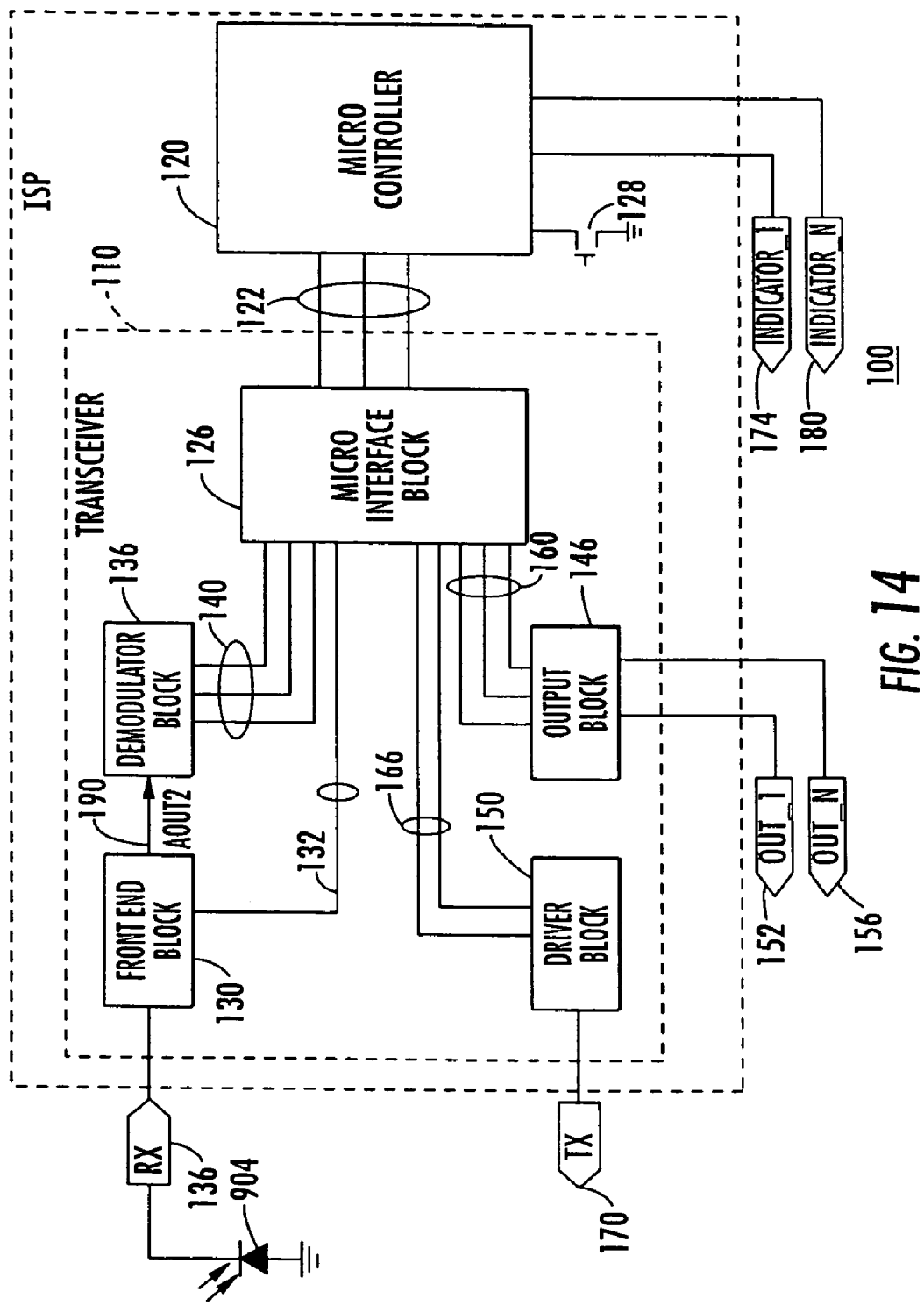
FIG. 14 is an overall block diagram of an embodiment of the Intelligent Sensor Platform of the present invention implementing an asynchronous photoelectric sensor.

FIG. 14 is an overall block diagram of an embodiment of the Intelligent Sensor Platform of the present invention implementing an asynchronous photoelectric sensor. In this embodiment, there is no drive provided to a light source and the photodiode 904 detects a unique pattern from an external source to detect an event or initiate programming.

Figure 15:
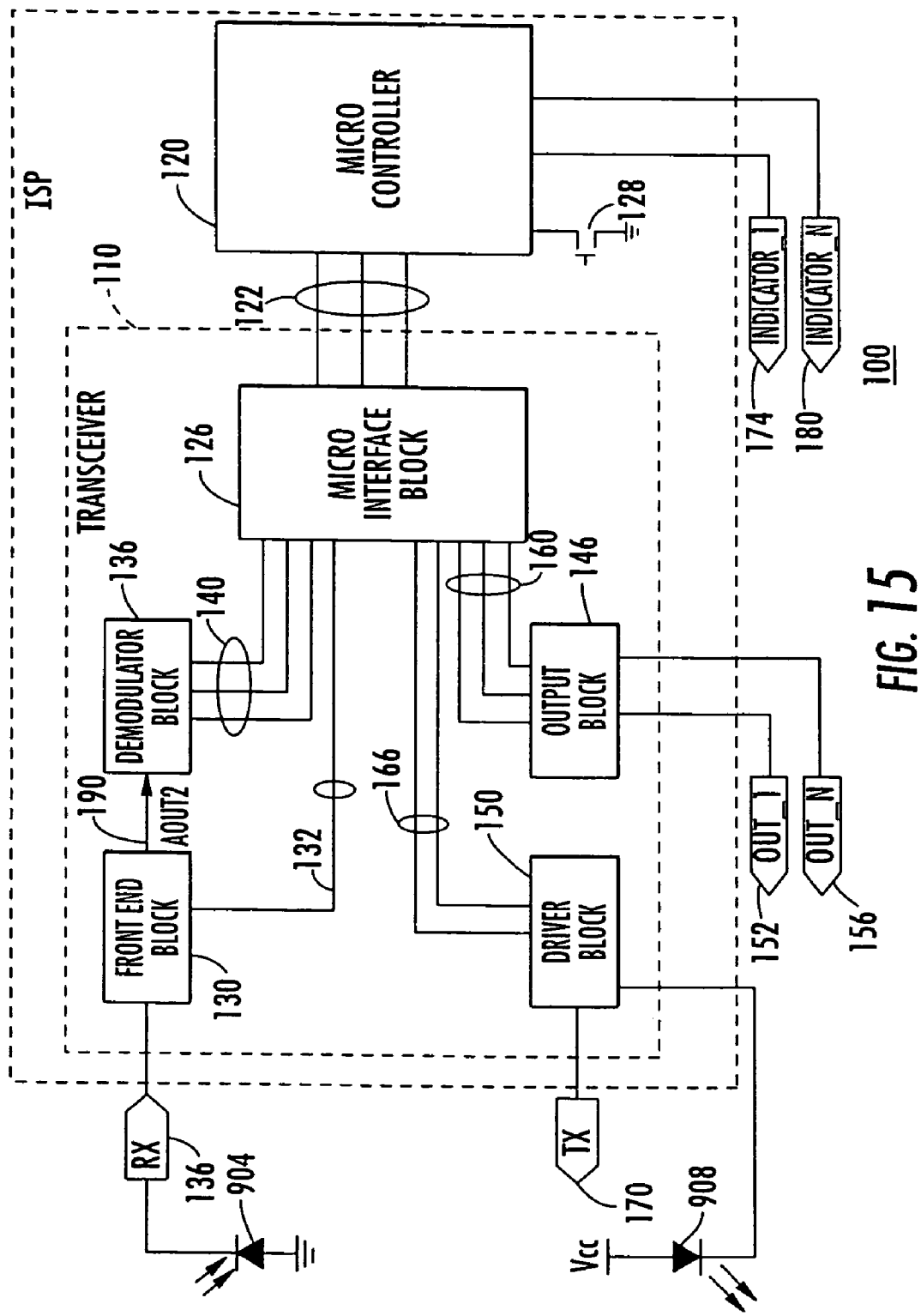
FIG. 15 is an overall block diagram of an embodiment of the Intelligent Sensor Platform of the present invention implementing an asynchronous photoelectric sensor with photoelectric remote control.

FIG. 15 is an overall block diagram of an embodiment of the Intelligent Sensor Platform of the present invention implementing an asynchronous photoelectric sensor with photoelectric remote control. Again, photodiode 904 detects a unique pattern from an external source to detect an event, but also serves to receive input from an optical remote controller for programming. A diode 908 coupled to a second channel (or the primary channel) of the driver block 150 serves to transmit information to the remote controller.

Figure 16:
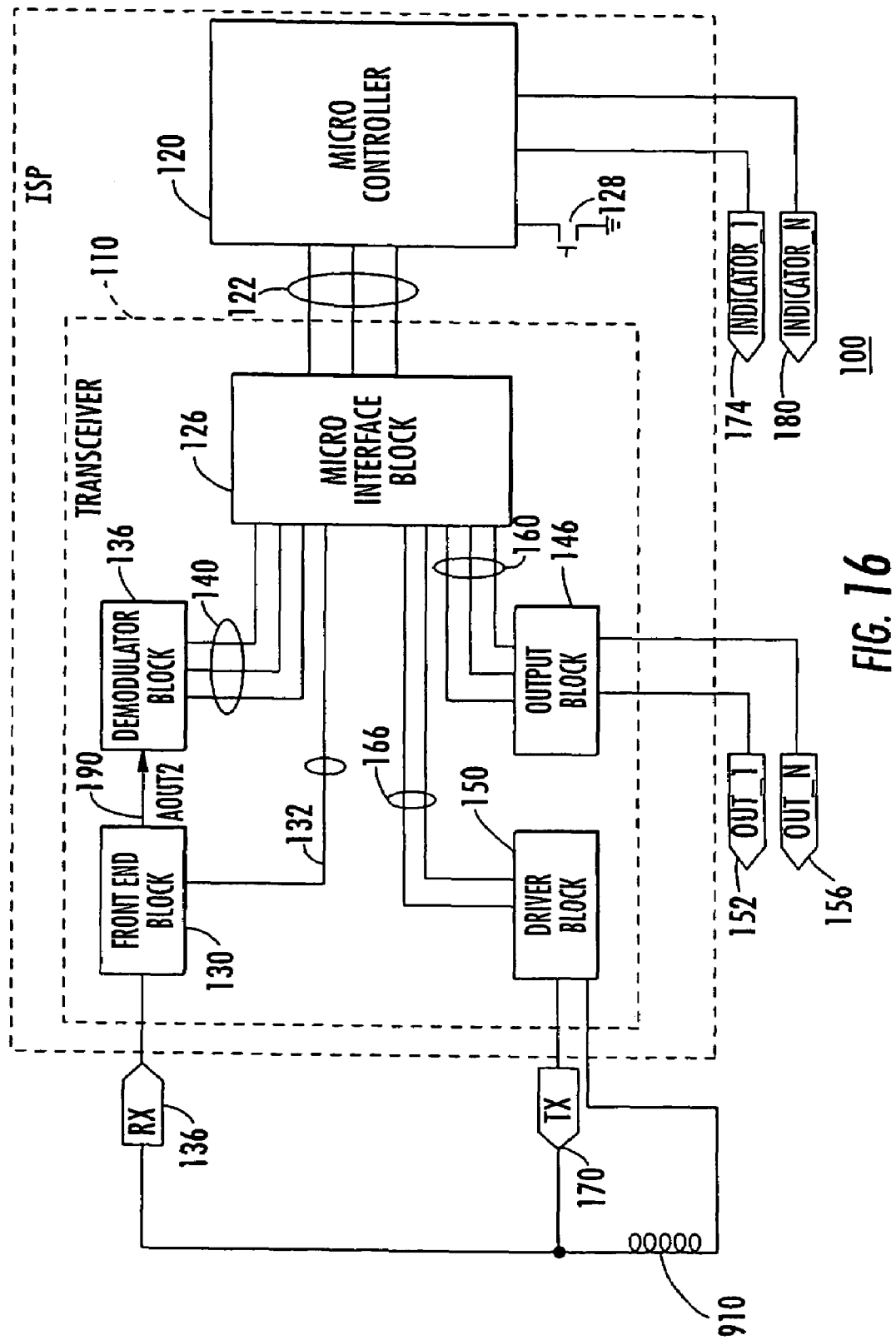
FIG. 16 is an overall block diagram of an embodiment of the Intelligent Sensor Platform of the present invention implementing an inductive sensor.

FIG. 16 is an overall block diagram of an embodiment of the Intelligent Sensor Platform of the present invention implementing an inductive sensor. In this embodiment, an inductor 910 is driven by the driver block 150 while the front end block 130 measures the response of the inductor 910 to the drive signal from driver block 150.

Figure 17:
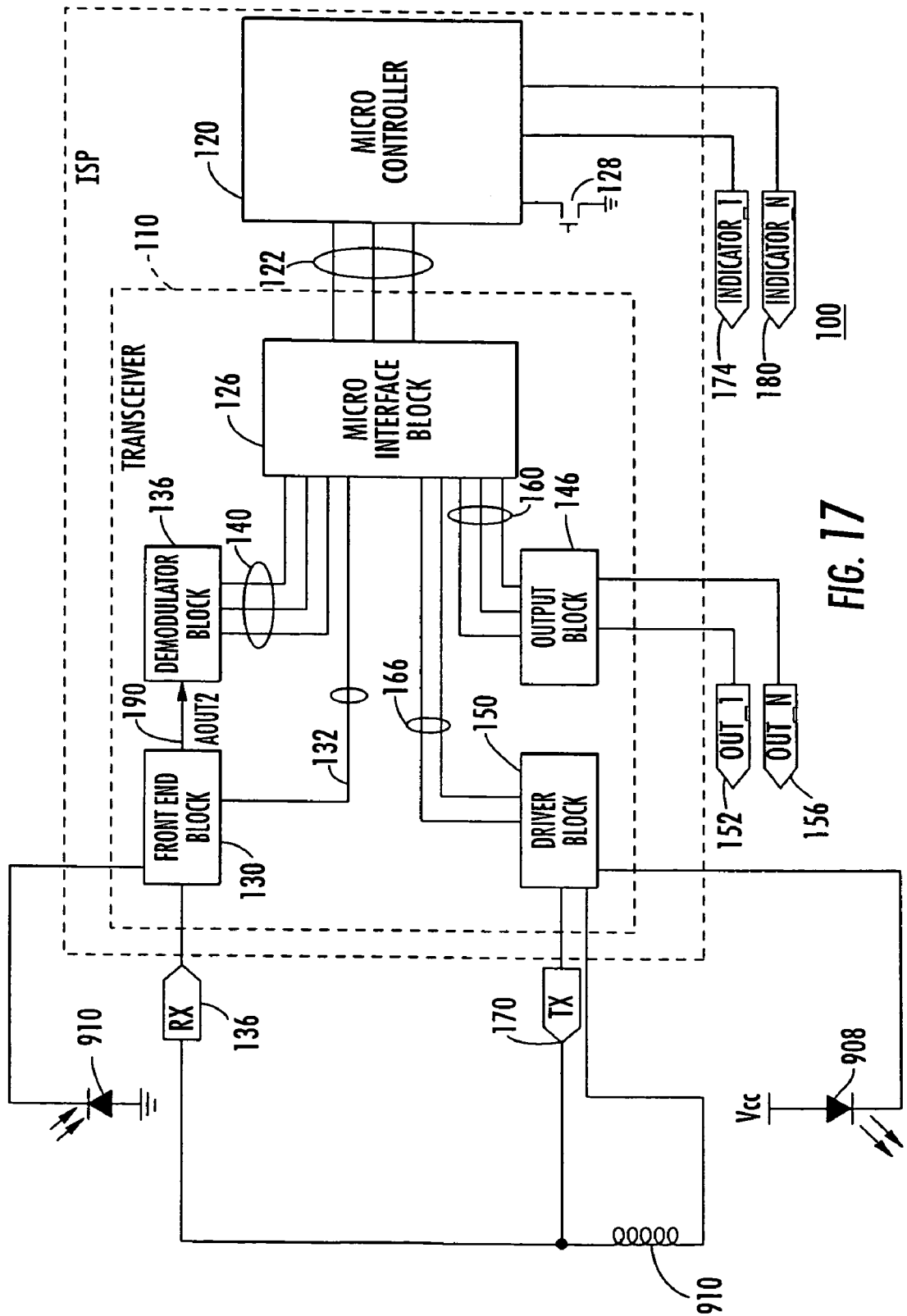
FIG. 17 is an overall block diagram of an embodiment of the Intelligent Sensor Platform of the present invention implementing an inductive sensor with optical remote control.

FIG. 17 is an overall block diagram of an embodiment of the Intelligent Sensor Platform of the present invention implementing an inductive sensor with optical remote control. In this embodiment, again inductor 910 is driven by the driver block 150 while the front end block 130 measures the response of the inductor 910 to the drive signal from driver block 150. LED 908 is also driven by the drive block 150 in order to send information to an optical remote controller while a photodiode 910 receives information for front end block 130 from the remote controller.

Figure 18:
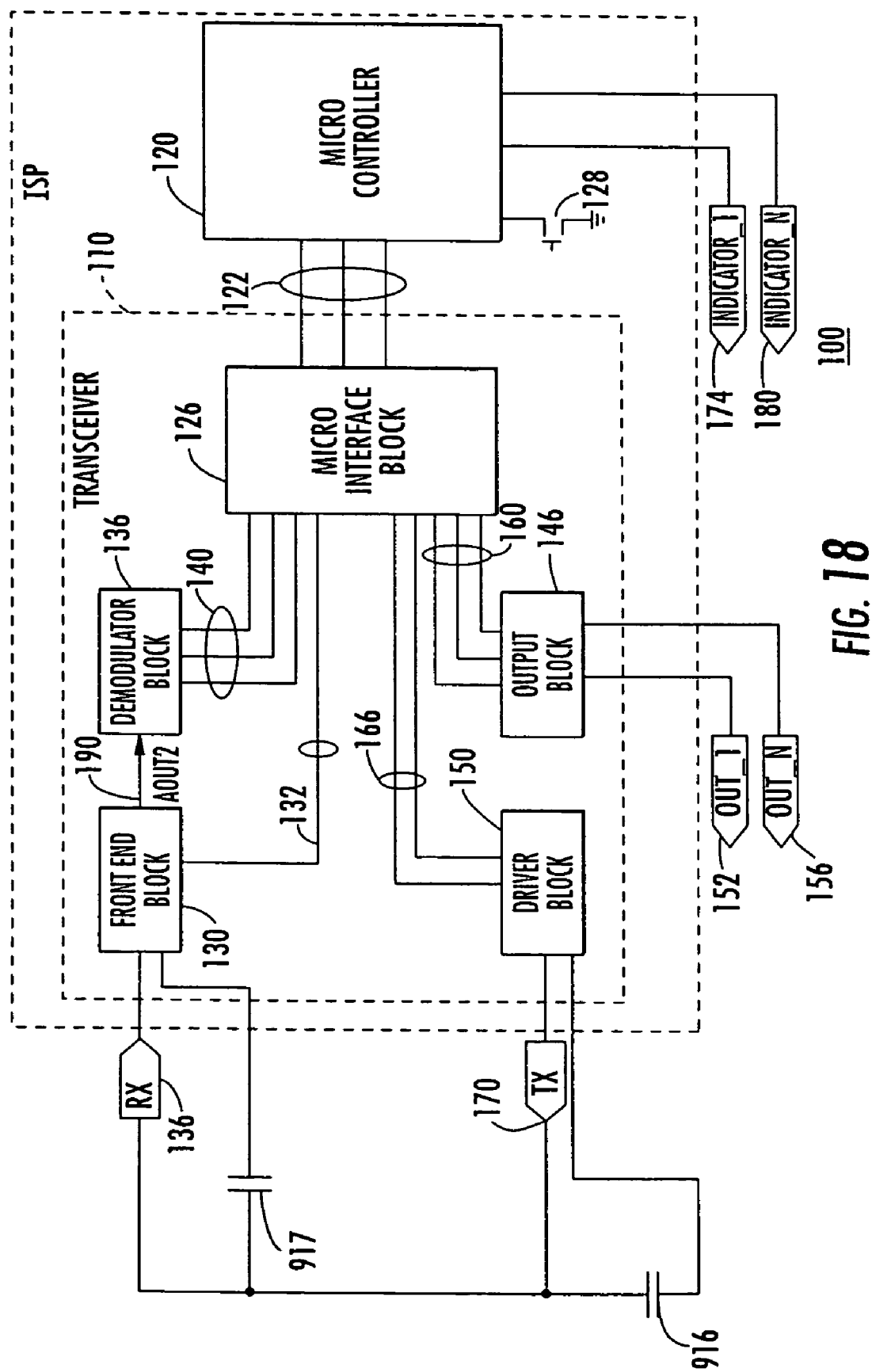
FIG. 18 is an overall block diagram of an embodiment of the Intelligent Sensor Platform of the present invention implementing a capacitive sensor.

FIG. 18 is an overall block diagram of an embodiment of the Intelligent Sensor Platform of the present invention implementing a capacitive sensor. In this embodiment, a capacitor 916 is driven by the driver block 150 while the front end block 130 measures the response of the capacitor 916 to the drive signal from driver block 150. Capacitor 917 can be provided as a reference capacitor.

Figure 19:
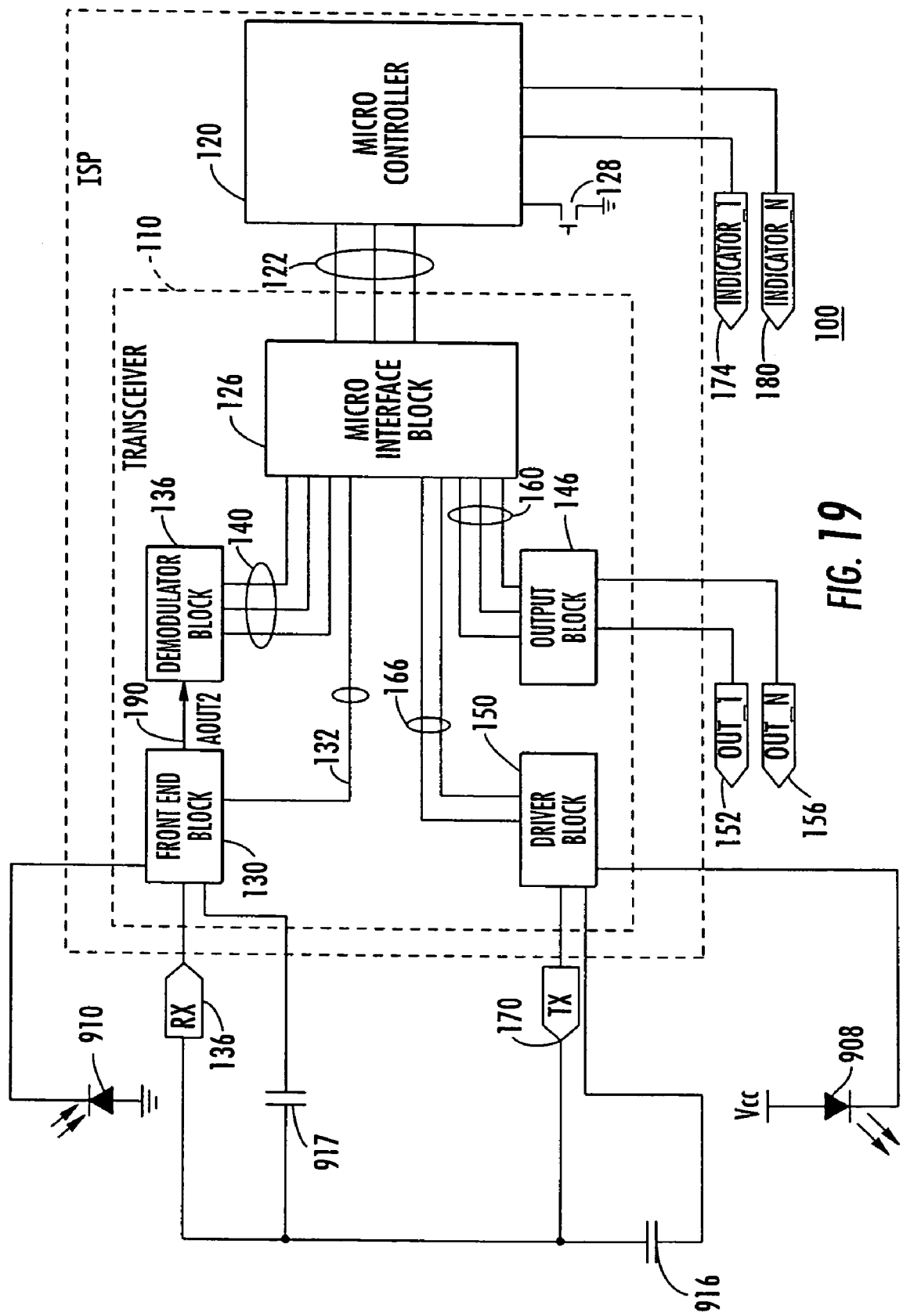
FIG. 19 is an overall block diagram of an embodiment of the Intelligent Sensor Platform of the present invention implementing a capacitive sensor with optical remote control.

FIG. 19 is an overall block diagram of an embodiment of the Intelligent Sensor Platform of the present invention implementing a capacitive sensor with optical remote control. In this embodiment, again capacitor 916 is driven by the driver block 150 while the front end block 130 measures the response of the capacitor 916 to the drive signal from driver block 150. LED 908 is also driven by the drive block 150 in order to send information to an optical remote controller while a photodiode 910 receives information for front end block 130 from the remote controller. Again, capacitor 917 can be provided as a reference capacitor.

Figure 20:
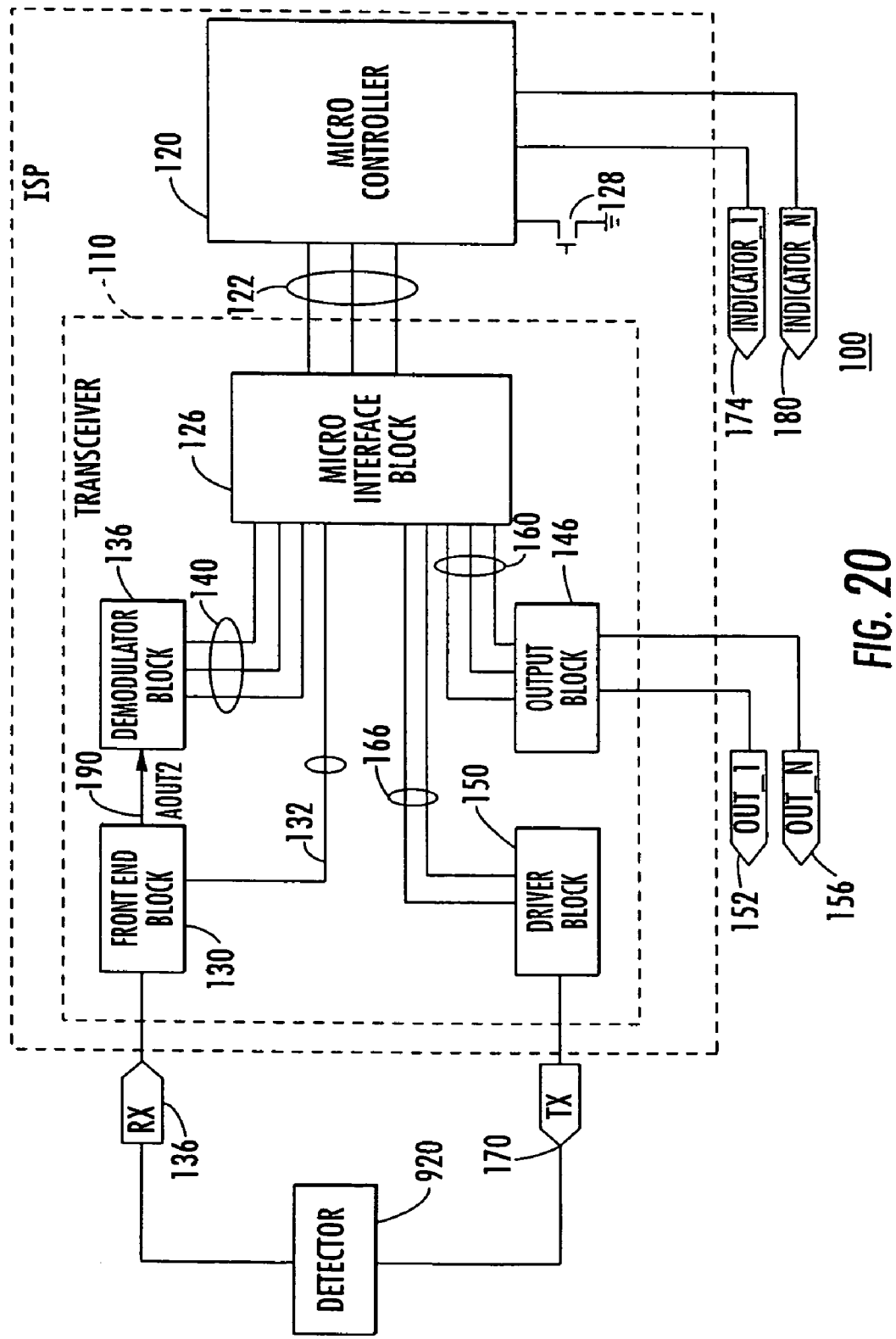
FIG. 20 is an overall block diagram of an embodiment of the Intelligent Sensor Platform of the present invention implementing a PIR (Passive InfraRed) sensor.

FIG. 20 is an overall block diagram of an embodiment of the Intelligent Sensor Platform of the present invention implementing a PIR (Passive InfraRed) sensor. In this example a PIR detector is disposed between the driver block 150 and the front end block 130 so that the signal from the driver block 150 is modified by the PIR detector 920 in the presence of infrared light.

Figure 21:
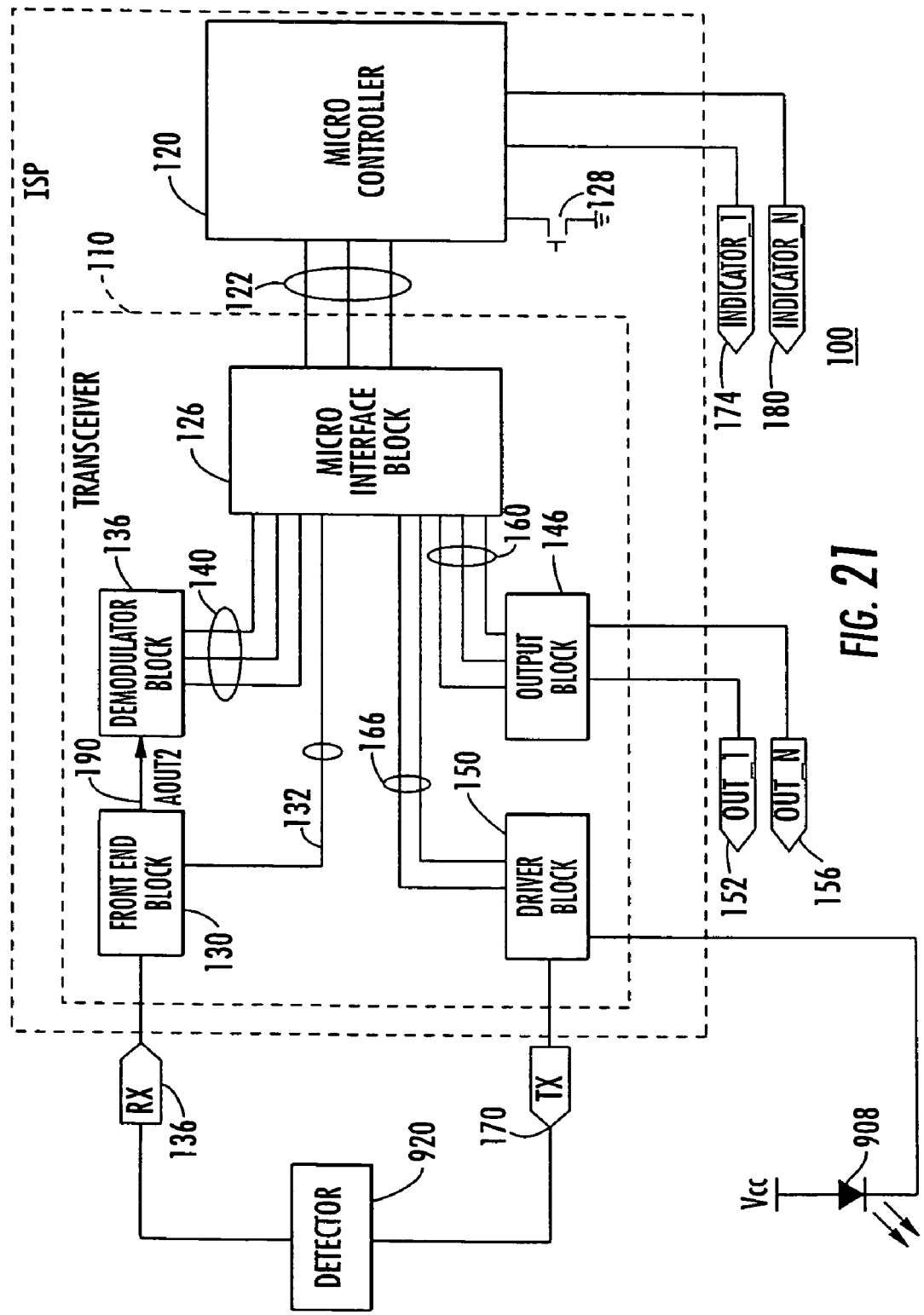
FIG. 21 is an overall block diagram of an embodiment of the Intelligent Sensor Platform of the present invention implementing a PIR (Passive InfraRed) sensor with an infrared LED.

FIG. 21 is an overall block diagram of an embodiment of the Intelligent Sensor Platform of the present invention implementing a PIR (Passive InfraRed) sensor with an infrared LED 908.

Figure 22:
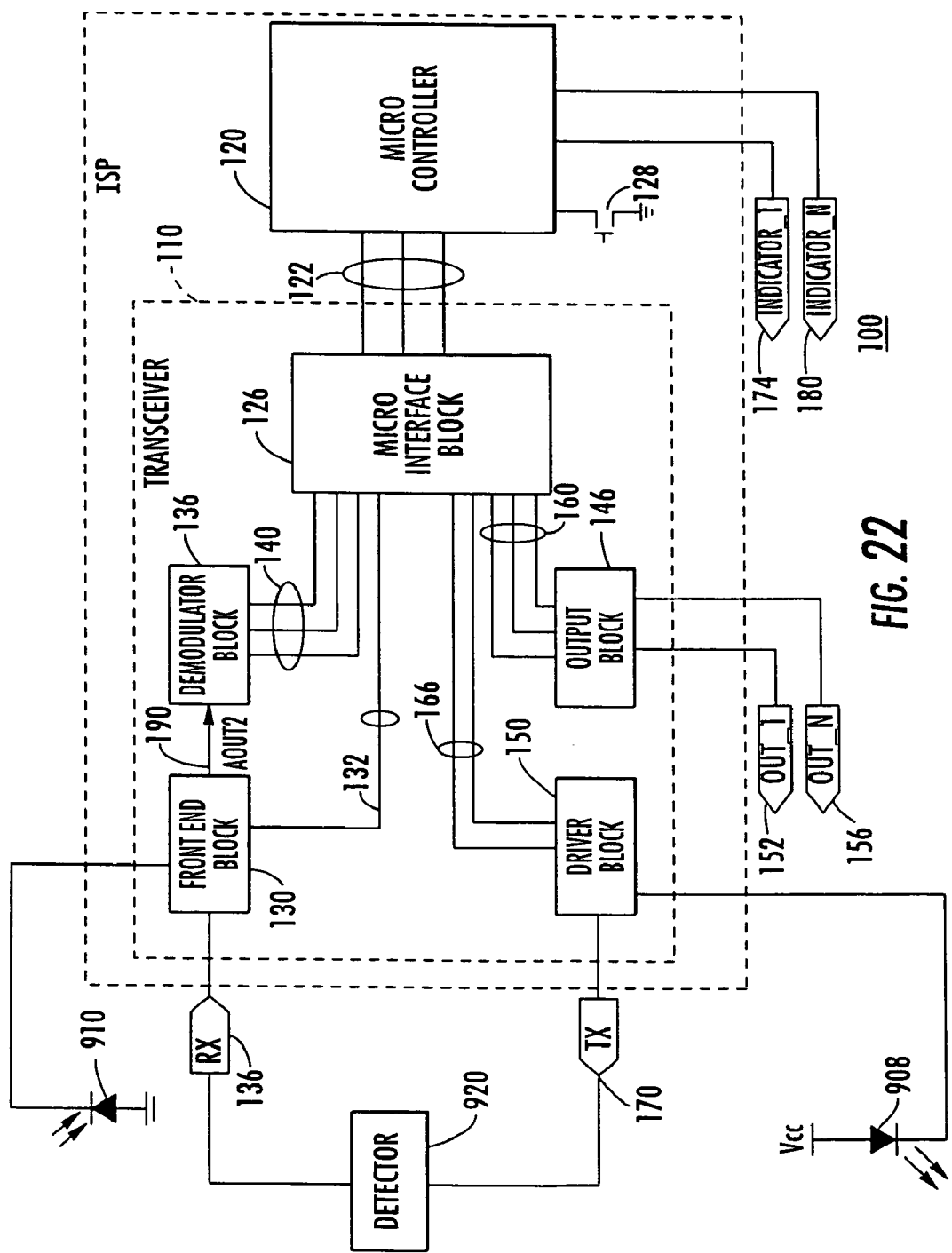
FIG. 22 is an overall block diagram of an embodiment of the Intelligent Sensor Platform of the present invention implementing a PIR (Passive InfraRed) sensor with optical remote control.

FIG. 22 is an overall block diagram of an embodiment of the Intelligent Sensor Platform of the present invention implementing a PIR (Passive InfraRed) sensor with optical remote control. In this example again a PIR detector is disposed between the driver block 150 and the front end block 130 so that the signal from the driver block 150 is modified by the PIR detector 920 in the presence of infrared light. LED 908 is also driven by the drive block 150 in order to send information to an optical remote controller while a photodiode 910 receives information for front end block 130 from the remote controller.

Figure 23:
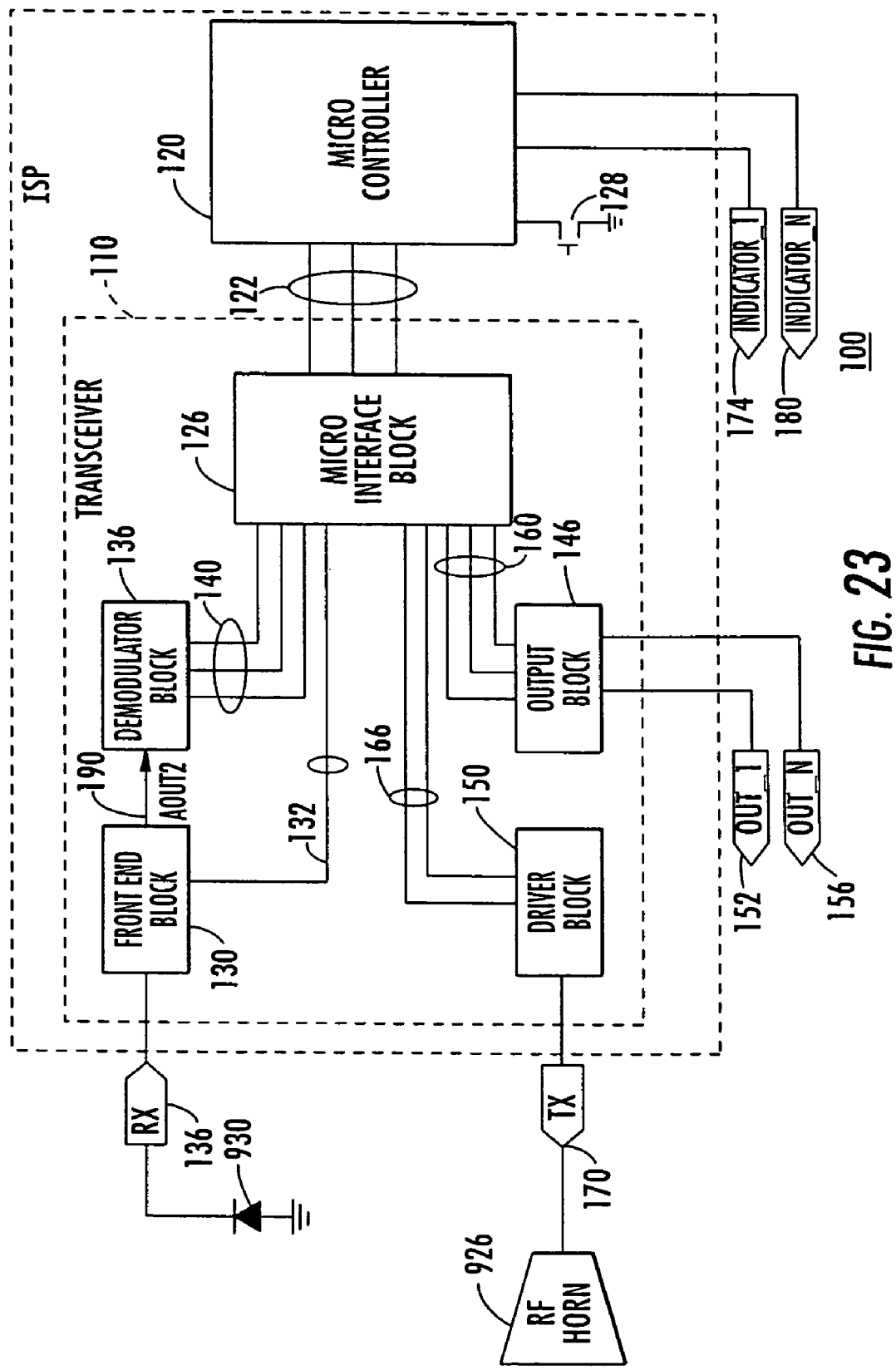
FIG. 23 is an overall block diagram of an embodiment of the Intelligent Sensor Platform of the present invention implementing a Radio Frequency (RF) sensor.

FIG. 23 is an overall block diagram of an embodiment of the Intelligent Sensor Platform of the present invention implementing a Radio Frequency (RF) sensor. In this embodiment, a RF horn or other antenna is driven at an RF frequency to provide a signal which is picked up by RF detector 930.

Figure 24:
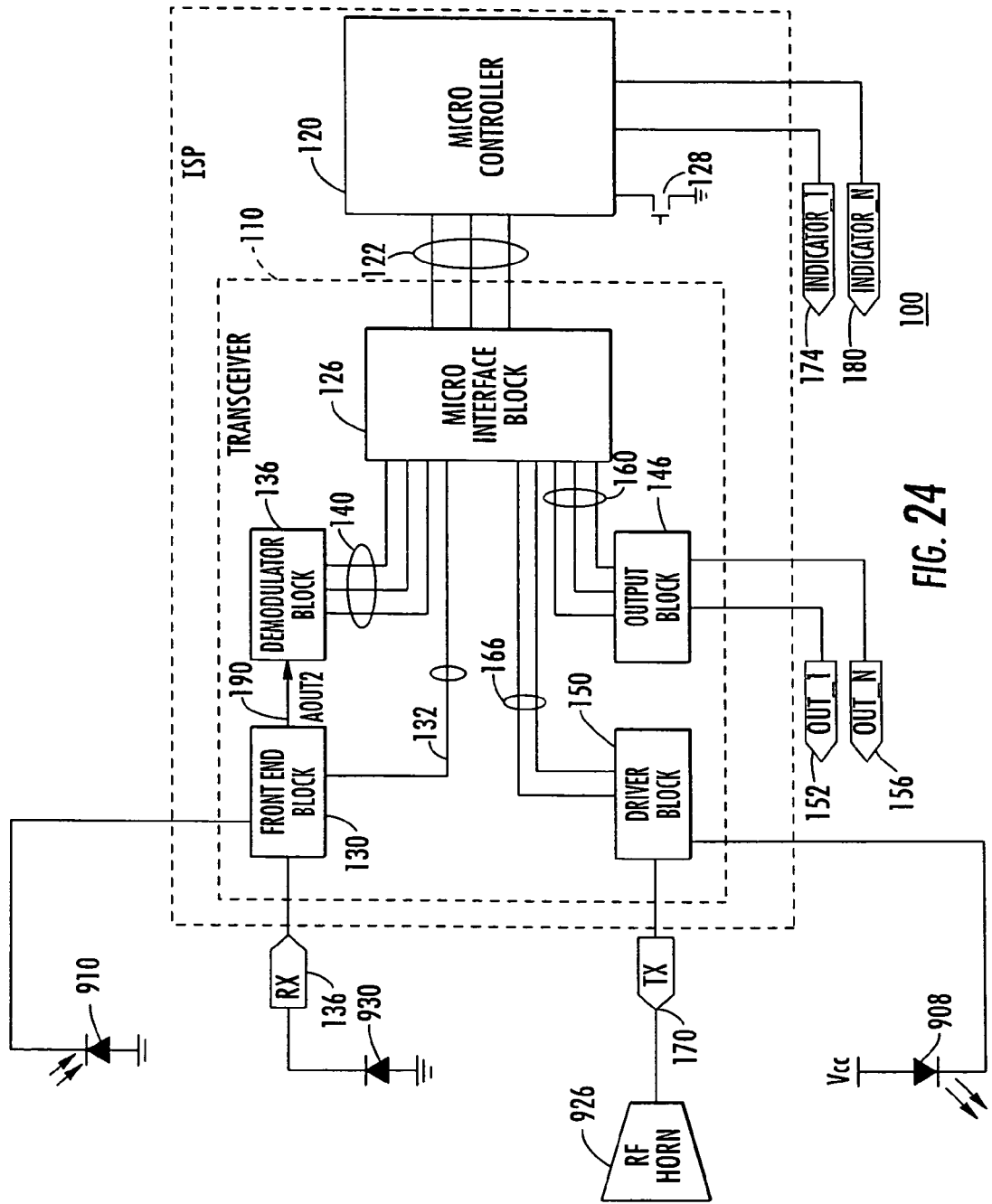
FIG. 24 is an overall block diagram of an embodiment of the Intellegent Sensor Platform of the present invention implementing an RF sensor with optical remote control.

FIG. 24 is an overall block diagram of an embodiment of the Intelligent Sensor Platform of the present invention implementing an RF sensor with optical remote control. In this embodiment, again RF horn or other antenna is driven at an RF frequency to provide a signal which is picked up by RF detector 930. Diodes 908 and 910 are used as previously described for communication with an optical remote controller.

Figure 25:
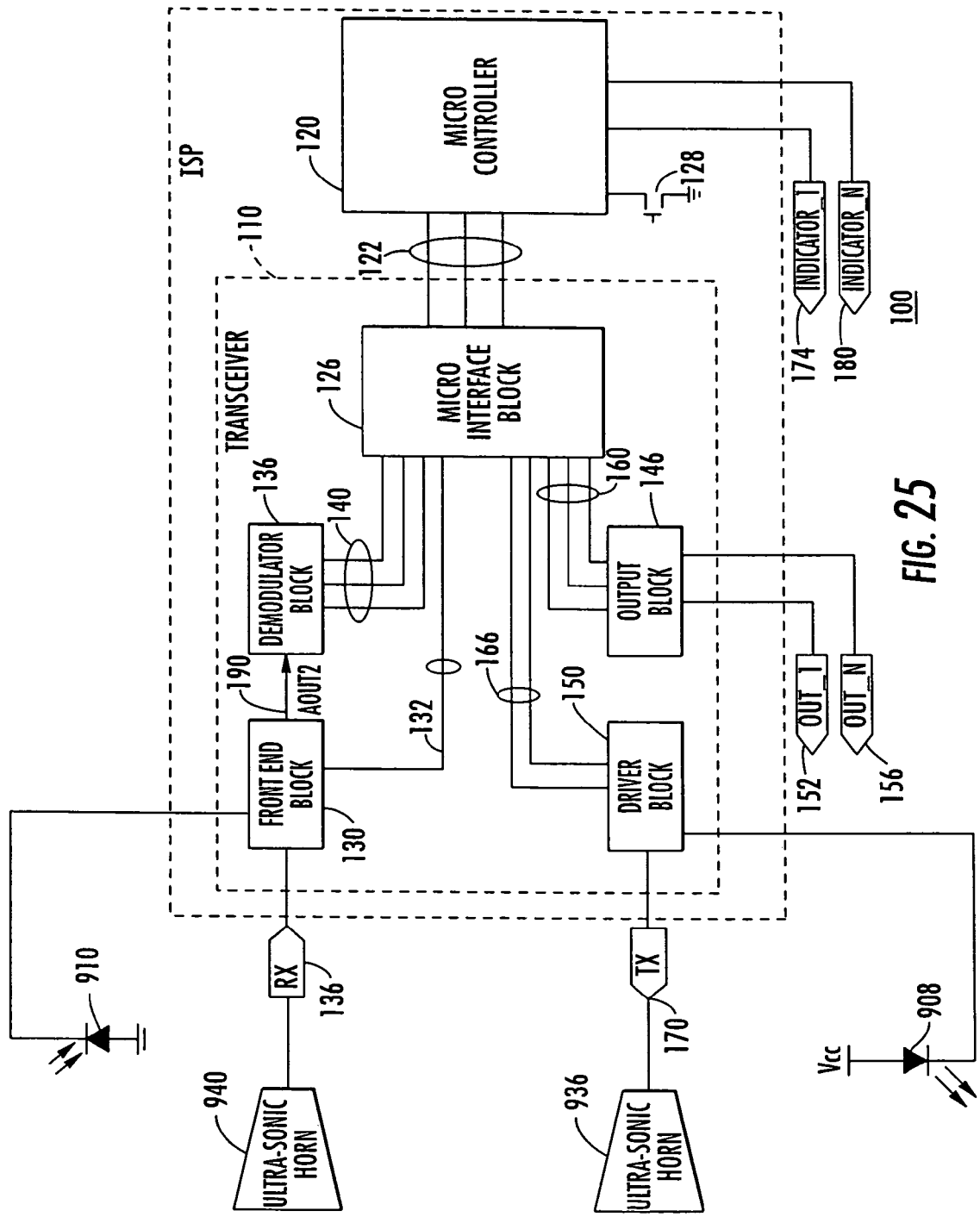
FIG. 25 is an overall block diagram of an embodiment of the Intelligent Sensor Platform of the present invention implementing an ultrasonic sensor with optical remote control.

FIG. 25 is an overall block diagram of an embodiment of the Intelligent Sensor Platform of the present invention implementing an ultrasonic sensor with optical remote control. In this example, an ultrasonic horn 936 or other transducer is driven by the driver block 150 and ultrasonic signals are received and measured at the horn or other transducer 940. Again, optical remote control is provided by diodes 908 and 910.

Those skilled in the art will understand that multiple channels can be provided for on the transceiver 110 or can be implemented off the transceiver as multiplexer circuitry. Many other possible variations in sensor configuration are possible by use of the current architecture. Moreover, those skilled in the art will understand that although the present invention has been disclosed in terms of use of an optical remote controller, other types of remote control could be implemented. For example, inductive or capacitive sensor systems could readily use an inductively coupled or capacitively coupled remote controller. Similarly, RF, microwave, optical and magnetic control and sensor configurations can be mixed and matched depending upon the particular advantages each might provide in any particular application. Thus, the present invention contemplates any combination of sensor and remote control configurations.

Thus, the present invention has many advantages. Reduced inventory is possible due to the fact that identical ISP based sensors can be programmed with different personality to serve different purposes. The personality of the device can be programmed at the time of shipment. Since all devices are in the fact the same model with different program code, substantial economies of scale can be achieved. There is a low external component count which keeps the overall manufacturing cost of the ISP based sensor devices low.

The ISP 100's architectural efficiency provides minimum cost, minimum size solution to the limitations of the currently available sensors, while offering to the supplier access to previously unavailable market opportunities. ISP supports Standard, Enhanced and Advanced feature sets via software personality modules, rather than hardware modifications. Thus, the manufacturing cost of ISP based sensors is independent of the feature set. The ISP 100 based sensor addresses requirements of the end users even in their smallest volumes with no manufacturing cost penalty. The manufacturing margin of such units is generally higher, since the user perceives additional value in the custom feature set. Additionally, small size of ISP and its remote programmability allows it to be placed in the environments where standard adjustability/configuration approaches are not feasible or where the size requirements is such that standard solutions are not practical.

There are many advantages to the end user of ISP based sensors. Many features can be implemented at a low price. System design and debugging can be simplified by distributed processing (using multiple intelligent sensor platform based sensors operating independently). The small size simplifies mounting and fixturing. Increased personal safety for operating equipment and for troubleshooting is realized because of the ability to program the sensor in a hands-off manner using the remote control. The same wiring can be used for many different configurations. The indicator functions as well as the I/O, Timing and Logic are field programmable. Sensitivity can be adjusted using remote or push button interface. Optional windowing and learn modes can be implemented. A programmable inventory of spare or new parts can be maintained at lower overall cost than using many different types of sensors arrangements.

While the above architecture using a transceiver circuit 110 implemented as an ASIC and a separate microcontroller 120 is considered advantageous to most applications, those skilled in the art will appreciate that minor deviations from this architecture (e.g. implementing the front end block 130 or the driver block 150 or the output block 146 as circuits outside of the transceiver ASIC) may be advantageous for certain applications and are considered equivalent. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A sensor circuit which operates under control of a controller circuit, the sensor circuit comprising:
    a front end circuit which receives an input signal from a sensor element and amplifies the input signal to produce an amplified signal therefrom;
    a demodulator receiving the amplified signal and converting the amplified signal to a digital signal, wherein the demodulator comprises a threshold detector having at least one of a hysteresis level or a threshold as an operational parameter set under control of the controller circuit;
    wherein the front end circuit comprises an amplifier having programmable gain or transconductance that is set by an operational parameter set under control of the controller circuit;
    an interface circuit coupled to the controller and relaying operational parameters and commands from the controller to the demodulator and the front end circuit, and for relaying the digital signal to the controller; and
    an output circuit for producing an output signal in response to commands from the controller in response to receipt of the digital signal by the controller.

2. The sensor circuit of claim 1, wherein the controller comprises a microcontroller and the interface circuit is coupled to the microcontroller by a bidirectional three line digital serial communication bus.

3. The sensor circuit of claim 2, wherein the controller determines when the output of the output block is to change and implements the change by changing a Write/Read line of the three line interface and then writing new output values to latches in the interface circuit.

4. The sensor of claim 1, further comprising a driver circuit which drives a signal transducer under control of the controller, the driver having a programmable drive level that is set by the operational parameter.

5. The sensor circuit of claim 4, further comprising a transmitter coupled to the driver circuit, and wherein the transmitter is driven by the controller.

6. The sensor circuit of claim 5, wherein the transmitter comprises an optical transmitter.

7. The sensor circuit of claim 4, wherein the front end circuit, interface circuit, output circuit, driver circuit and demodulator circuit are implemented in a single integrated circuit.

8. The sensor circuit of claim 1, further comprising a short circuit detection circuit for detecting a short circuit condition in a circuit driven by the output signal of the output circuit, and wherein the controller reads the short circuit condition as an operational parameter and makes a determination to take a corrective action.

9. The sensor circuit of claim 1, further comprising the sensor element coupled to the front end circuit for sensing an event.

10. The sensor circuit of claim 9, wherein the sensor element comprises one of an optical sensor element, an infrared sensor element, an RF sensor element, a capacitive sensor element, an inductive sensor element and an ultrasonic sensor element.

11. The sensor circuit of claim 1, wherein the sensor circuit operates in a normal sensing mode in accordance with a multiple cycle clock, with at least one clock cycle used for reading a short circuit status from the short circuit detection circuit, and one cycle in which the output of the front end block in comparison to a first threshold is read.

12. The sensor circuit of claim 1, further comprising a switch, and wherein the operational parameter is controlled by a sequence of operations of the switch.

13. A method of controlling a sensor circuit operation to detect an event, comprising:
  in a controller, driving a sensor transmitter and acquiring sensor circuit state information from an interface circuit at timed intervals;
  calculating a sensor circuit operational parameter in the controller and sending a command that changes the sensor circuit operational parameter to the interface circuit for relaying to the sensor circuit;
  conducting an analysis of the sensor circuit state information in the controller to determine if the event has occurred;
  if the event is deemed by the controller to have occurred, taking a programmed action; and
  wherein the controller makes the determination of detection of the event by determining that an input signal has crossed a plurality of threshold values in an established sequence.

14. The method of claim 13, further comprising:
  receiving input signals representing actuations of a switch; and
  changing an operational parameter of the sensor in response to receipt of the input signals representing actuation of the switch.

15. The method of claim 13, wherein the receiving of input signals representing actuations of the switch happens during one cycle of a plurality of cycles of a clock, and wherein the sensor circuit operates to detect the event during another of the plurality of cycles of a clock.

16. A method of adjusting an operational parameter of a sensor circuit, comprising:
  detecting a first actuation of a switch for a specified period of time, said first actuation of the switch enabling an adjustment mode;
  detecting subsequent actuations of the switch occurring within a time window;
  adjusting a sensor circuit parameter in accordance with a switch actuation occurring within said time window; and
  wherein the switch actuations are detected during one cycle of a plurality of cycles of a clock, and wherein the sensor circuit operates to detect an event during another of the plurality of cycles of a clock.

17. The method of claim 16, wherein the operational parameter comprises at least one of a gain or a transconductance of an amplifier.

18. The method of claim 16, further comprising pulsing an indicator light at a rate indicative of a value of the sensor circuit's operational parameter.

19. A method of controlling a sensor circuit operation to detect an event, comprising:
  in a controller, driving a sensor transmitter and acquiring sensor circuit state information from an interface circuit at timed intervals;
  receiving input signals representing actuations of a switch;
  changing an operational parameter of the sensor in response to receipt of the input signals representing actuation of the switch;
  calculating a sensor circuit operational parameter in the controller and sending a command that changes the sensor circuit operational parameter to the interface circuit for relaying to the sensor circuit;
  conducting an analysis of the sensor circuit state information in the controller to determine if the event has occurred; and
  if the event is deemed by the controller to have occurred, taking a programmed action.

20. The method of claim 19, wherein the receiving of input signals representing actuations of the switch happens during one cycle of a plurality of cycles of a clock, and wherein the sensor circuit operates to detect the event during another of the plurality of cycles of a clock.

* * * * *